US011184547B2

(12) United States Patent
Numata

(10) Patent No.: US 11,184,547 B2
(45) Date of Patent: Nov. 23, 2021

(54) IMAGING DEVICE, METHOD FOR CONTROLLING IMAGING DEVICE, AND RECORDING MEDIUM

(71) Applicant: CANON KABUSHIKI KAISHA, Tokyo (JP)

(72) Inventor: Aihiko Numata, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/889,101

(22) Filed: Jun. 1, 2020

(65) Prior Publication Data

US 2020/0396385 A1 Dec. 17, 2020

(30) Foreign Application Priority Data

Jun. 11, 2019 (JP) .............................. JP2019-108881

(51) Int. Cl.
 *H04N 5/232* (2006.01)
(52) U.S. Cl.
 CPC ..... *H04N 5/23296* (2013.01); *H04N 5/23238* (2013.01)
(58) Field of Classification Search
 CPC ....... H04N 5/232945; H04N 5/232933; H04N 7/183; H04N 5/23267; H04N 5/23238; H04N 5/23216; H04N 5/2259; H04N 5/23206; H04N 5/23296; H04N 5/247; G08B 13/19628
 See application file for complete search history.

(56) References Cited

U.S. PATENT DOCUMENTS

| 7,539,356 | B2 | 5/2009 | Igari et al. |
| 8,957,945 | B2 * | 2/2015 | Miyamoto ........... H04N 5/2625 348/36 |
| 9,374,528 | B2 * | 6/2016 | Watanabe .......... H04N 5/23238 |
| 9,736,371 | B2 * | 8/2017 | Taneichi .............. H05K 999/99 |
| 10,110,820 | B2 * | 10/2018 | Oba ................. H04N 5/232945 |

(Continued)

FOREIGN PATENT DOCUMENTS

JP 2004118786 A 4/2004

OTHER PUBLICATIONS

Extended European Search Report dated Oct. 28, 2020, for Corresponding European Application No. 20179047.4.

*Primary Examiner* — Chiawei Chen
(74) *Attorney, Agent, or Firm* — Carter, DeLuca & Farrell LLP

(57) ABSTRACT

To provide an imaging device for controlling imaging ranges of a plurality of imaging units, the imaging device includes: a first imaging unit and a second imaging unit; a driving mechanism for controlling an imaging range of at least one of the first imaging unit and the second imaging unit; a synthesizing unit for synthesizing a first image acquired by the first imaging unit and a second image acquired by the second imaging unit to generate a wide-angle image; a display unit for displaying an image; a user interface used for a user to designate an region or a position in the image displayed by the display unit; and a control unit for controlling the imaging range of at least one of the first imaging unit and the second imaging unit in accordance with the designated region or position and control whether the synthesizing unit performs synthesizing.

15 Claims, 15 Drawing Sheets

(56) References Cited

U.S. PATENT DOCUMENTS

| | | | |
|---|---|---|---|
| 2006/0049350 A1* | 3/2006 | Teich | H04N 5/23238 250/330 |
| 2011/0234640 A1* | 9/2011 | Ishida | H04N 5/232941 345/671 |
| 2011/0310219 A1 | 12/2011 | Kim et al. | |
| 2012/0257064 A1* | 10/2012 | Kim | G08B 13/19626 348/159 |
| 2014/0192212 A1* | 7/2014 | He | H04N 5/23229 348/211.11 |
| 2016/0073022 A1* | 3/2016 | Kimura | H04N 5/23238 348/36 |
| 2016/0301836 A1 | 10/2016 | Hjelmstrom et al. | |
| 2019/0028651 A1* | 1/2019 | Oba | G06F 3/04845 |
| 2019/0335120 A1* | 10/2019 | Suzuki | H04N 5/23238 |
| 2020/0033701 A1 | 1/2020 | Numata | |
| 2020/0051265 A1* | 2/2020 | Kim | H04N 5/23287 |
| 2020/0098148 A1 | 3/2020 | Numata | |
| 2020/0137293 A1 | 4/2020 | Numata | |
| 2020/0145585 A1* | 5/2020 | Kim | H04N 5/23216 |
| 2020/0154087 A1 | 5/2020 | Numata | |
| 2020/0294214 A1 | 9/2020 | Numata | |
| 2020/0366854 A1 | 11/2020 | Numata | |
| 2020/0374469 A1 | 11/2020 | Numata | |

* cited by examiner

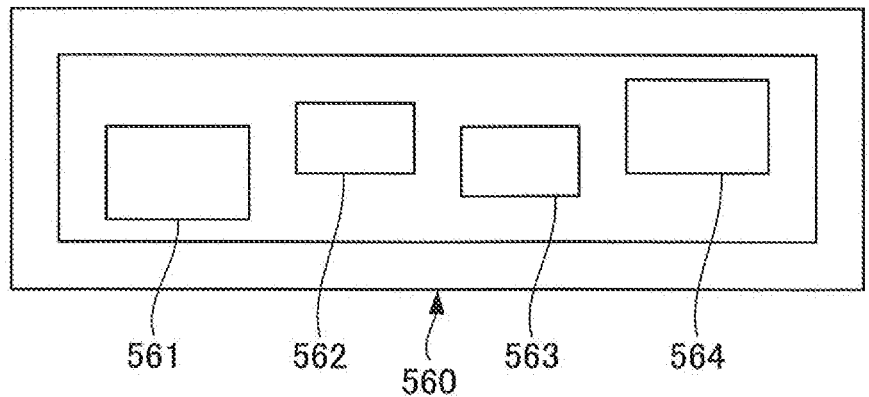
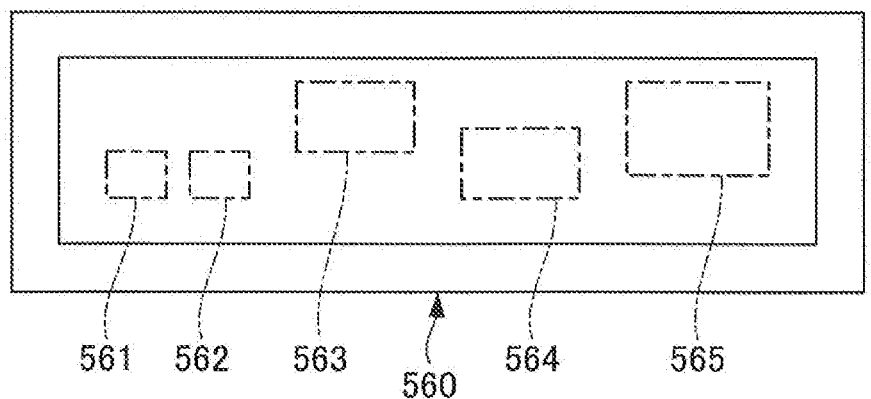
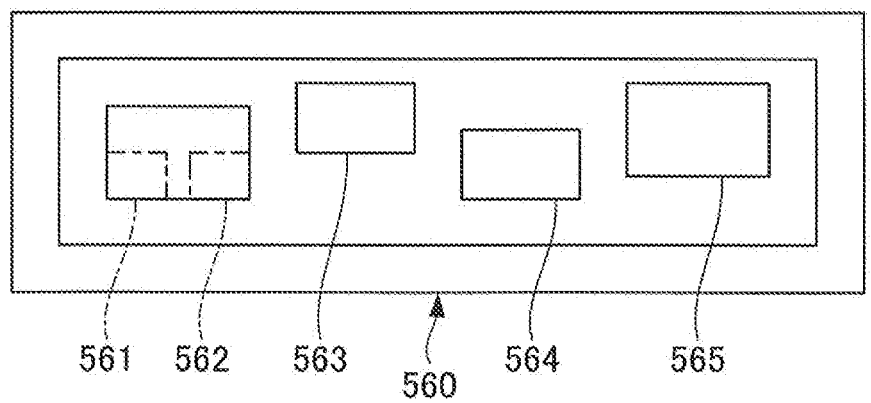

IMAGING DEVICE, METHOD FOR CONTROLLING IMAGING DEVICE, AND RECORDING MEDIUM

BACKGROUND OF THE INVENTION

Field of the Invention

The present invention relates to an imaging device or the like appropriate for uses such as surveillance.

Description of the Related Art

In recent years, imaging devices capable of acquiring images with broader imaging ranges (wide-angle images) than in a case in which single cameras are used, by synthesizing images captured by a plurality of cameras (hereinafter referred to as multi-eye cameras) arranged side by side have been proposed. In Japanese Unexamined Patent Publication No. 2004-118786, an imaging device that can generate a wide-angle image by performing a matching process while shifting images captured by each multi-eye camera to obtain a shift amount between a plurality of images has been proposed.

Further, an imaging device capable of controlling a direction of the imaging device, which is called a pan tilt zoom (PTZ) camera, has been proposed as an imaging device for changing an imaging direction and so on thereof after the imaging device is installed.

In the imaging device disclosed in Japanese Unexamined Patent Publication No. 2004-118786, the position of each multi-eye camera is fixed. On the other hand, by adding a mechanism that controls an imaging direction of each multi-eye camera, it is possible to change a location to which the user desires to monitor.

However, in order to match the imaging direction of each multi-eye camera with the location to which the user desires to monitor, it is necessary to perform trial and error of controlling the imaging direction of the multi-eye camera while checking an imaging range of each multi-eye camera.

According to an aspect of the present invention, an objective of the present invention is to provide an imaging device capable of easily controlling an imaging range of a plurality of imaging units.

SUMMARY OF THE INVENTION

According to an aspect of the present invention, an imaging device connected to an external apparatus via a network includes:

a first imaging unit and a second imaging unit;

a driving mechanism configured to control an imaging range of at least one of the first imaging unit and the second imaging unit; and at least one processor or circuit which functions as;

a synthesizing unit configured to synthesize a first image acquired by the first imaging unit and a second image acquired by the second imaging unit to generate a wide-angle image;

a receiving unit configured to receive information relating to a region or a position designated by a user from the external apparatus, wherein the region or the position is designated with one of the first image and the second image or with an image indicating an imaging region displayed on a screen of a display unit of the external apparatus;

a control unit configured to control the imaging range of at least one of the first imaging unit and the second imaging unit and control whether the synthesizing unit performs synthesizing or not, in accordance with the region or the position designated by the user;

a transmitting unit configured to transmit the first image, the second image, and the wide-angle image to the external apparatus.

Further features of the present invention will become apparent from the following description of exemplary embodiments with reference to the attached drawings.

BRIEF DESCRIPTION OF THE DRAWINGS

FIGS. 11A to 11C are diagrams illustrating user interfaces of an imaging device according to Example 5.

DESCRIPTION OF THE EMBODIMENTS

Figure 1:
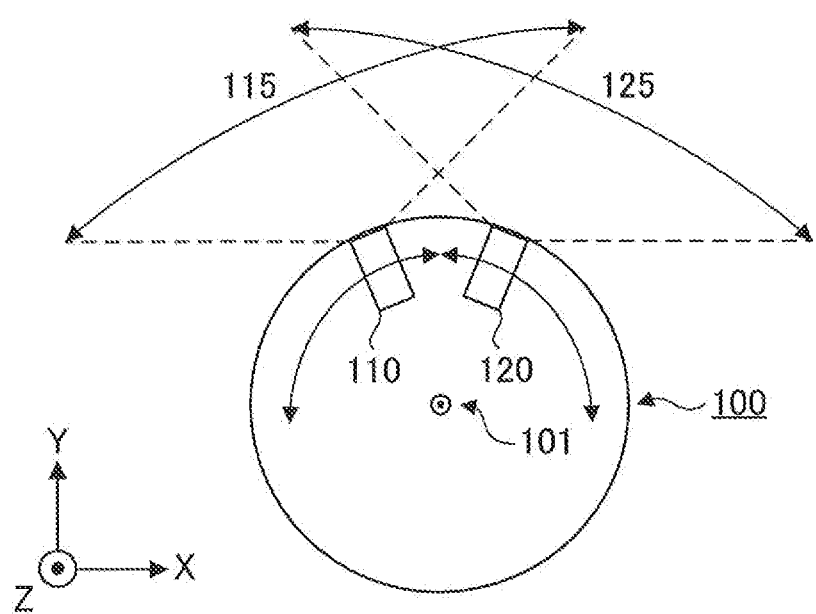
FIG. 1 is a layout diagram illustrating an imaging device according to Example 1 when viewed from the upper side.

Hereinafter, examples of an imaging device according to an embodiment of the present invention will be described with reference to the drawings. The same reference numerals are given to units that have the same functions in the drawings and repeated description thereof will be omitted.

In an embodiment, an example in which a network camera is applied as an imaging device will be described. However, the imaging device is assumed to include an electronic device that includes a plurality of imaging units, such as a digital still camera, a digital movie camera, a smartphone with a camera, or a tablet computer with a camera.

EXAMPLE 1

Figure 2:
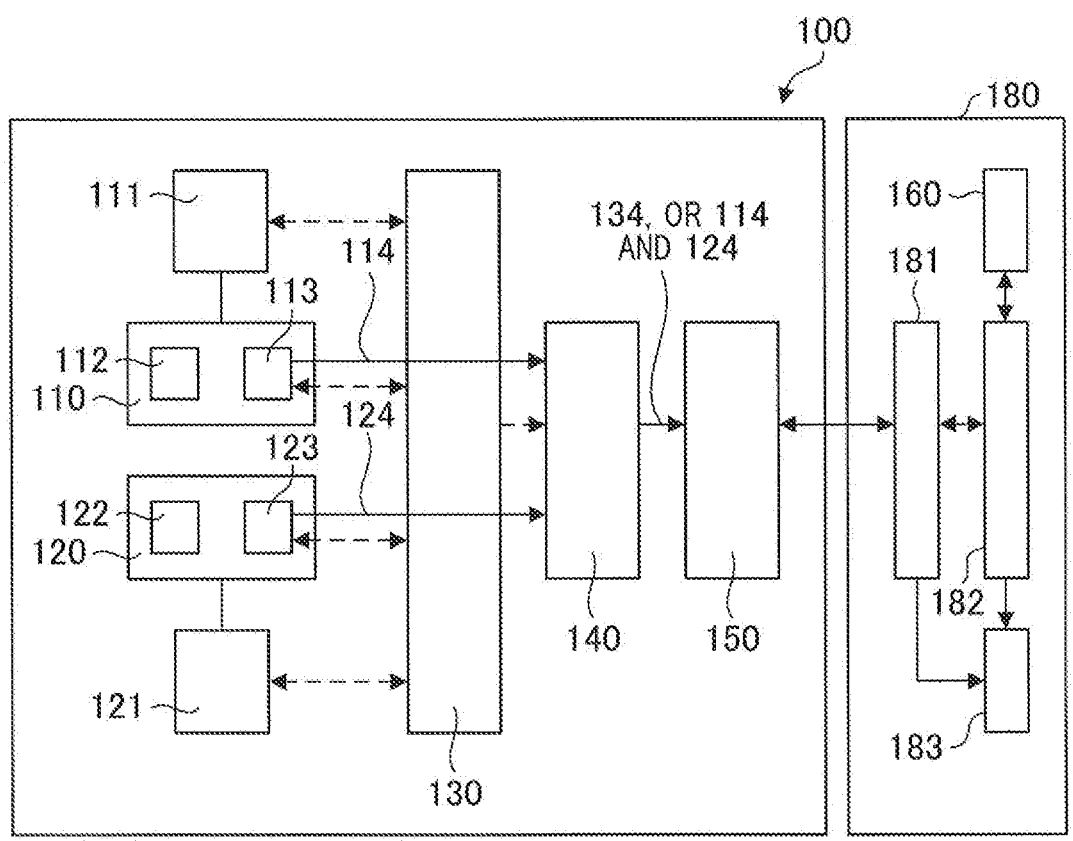
FIG. 2 is a functional block diagram illustrating the imaging device according to Example 1.

An imaging device and a surveillance system using the imaging device according to this example are illustrated in FIG. 1. FIG. 1 is a layout diagram illustrating an imaging device 100 according to this example when viewed from the upper side (the +Z axis side) and FIG. 2 is an internal functional block diagram. The imaging device 100 includes a first imaging unit 110, a second imaging unit 120, a first driving mechanism 111, a second driving mechanism 121, a control unit 130, a synthesizing unit 140, and a first transmitting unit 150.

The first driving mechanism 111 and the second driving mechanism 121 function as a driving unit and can control imaging directions of the first imaging unit 110 and the second imaging unit 120 in the same plane (the XY plane), respectively. The imaging device according to this example is configured to be able to control an imaging direction in a pan direction.

Specifically, as illustrated in FIG. 2, the first driving mechanism 111 and the second driving mechanism 121 each include motors and gears and are configured to be able to rotate the first imaging unit 110 and the second imaging unit 120 about an axis 101 of FIG. 1, which is a rotation axis, by controlling power for driving the motor.

The power for driving the motor is controlled by the control unit 130. That is, the imaging device 100 is configured to be able to change an imaging direction of each of the first imaging unit 110 and the second imaging unit 120 on the XY plane.

The first imaging unit 110 and the second imaging unit 120 include imaging optical systems 112 and 122 and solid-state image sensors 113 and 123 such as CMOS image sensors, respectively. Images are acquired by forming subject images on the solid-state image sensors 113 and 123 via the imaging optical systems 112 and 122.

Driving and signal reading of each of the solid-state image sensors 113 and 123 are controlled by the control unit 130. The control unit 130 contains a CPU as a computer and performs various operations of the entire device based on a computer program stored in a memory (not illustrated).

The synthesizing unit 140 synthesizes a first image 114 acquired by the first imaging unit 110 and a second image 124 acquired by the second imaging unit 120 to generate a wide-angle image (panorama image, synthesized image) 134.

Specifically, by applying a so-called pattern matching technology of obtaining a correlation coefficient while shifting overlapping portions of images, a position shift amount between a plurality of images is obtained to generate the wide-angle image 134. Further, in this example, in accordance with a region (an image region) or position designated by a user, the synthesizing unit 140 changes whether or not to generate the wide-angle image 134.

When the wide-angle image 134 is not generated, the synthesizing unit transmits the first image 114 and the second image 124 to the first transmitting unit 150 without synthesizing the first image 114 and the second image 124.

Further, in this example, the imaging range is a range which is imaged by the imaging unit. The imaging range is changed through control of, for example, an imaging direction, a zoom magnification, or a rotational angle of an imaging surface, or the like.

The first transmitting unit 150, which is a receiving unit and a transmitting unit, transmits an image (the first image 114 and the second image 124, or the wide-angle image 134) transmitted from the synthesizing unit 140 to an external client device (an external apparatus) 180 via a wired or wireless network.

The external client device 180 transmits a command for controlling the imaging device 100 to the first transmitting unit 150 via a second transmitting unit 181 and the network, and the imaging device 100 receives the command and makes a response to the command to the client device 180.

The command is, for example, a command for controlling the first driving mechanism 111 and the second driving mechanism 121. That is, the user can control directions of the first imaging unit 110 and the second imaging unit 120 via the network from the external client device 180.

The client device is, for example, an external device such as a PC and includes a user interface 160 used for the user to designate a region or position.

Reference numeral 182 denotes a control unit that performs internal control of the client device 180 and contains a computer such as a CPU. The control unit 182 contains a memory (not illustrated), and a computer program for controlling an operation of a CPU inside the control unit is stored in the memory.

Reference numeral 183 denotes a display unit and displays an image or the like transmitted from the imaging device 100. The user interface 160 includes various switches and a touch panel. Further, the user interface 160 includes a GUI such as a button or an icon displayed on the display unit 183. The user can give various instructions to the imaging device 100 by operating the user interface 160.

In accordance with the imaging frames (the region) or the (imaging) positions designated by the user via the user interface 160, the imaging device 100 according to this example controls imaging ranges of the first imaging unit 110 and the second imaging unit 120 and controls a synthesizing operation in the synthesizing unit 140.

The network is configured by a wired LAN, a wireless LAN, and the like. Power may be supplied to the imaging device 100 via the network.

In this example, the synthesizing unit 140 is provided inside the imaging device 100, but the synthesizing unit 140 may be provided inside the client device 180.

The imaging device 100 and the client device 180 are included in an imaging system.

In Example 1 illustrated in FIG. 2, the imaging device 100 includes the first transmitting unit 150, transmits an image to the client device 180, and operates in accordance with a command from the client device 180.

That is, the display unit 183, the control unit 182, and the user interface 160 are separate from the imaging device in this example. However, the imaging device 100 may integrally include a memory that stores image data and the display unit 183 that displays an image and the user interface 160 such as a switch or a touch panel that receives support of the user.

That is, the imaging device 100 may integrally have a function of the client device 180. The imaging device according to this example is assumed to have a system configuration in which the function of the client device 180 is included integrally or separately.

Figure 3A:
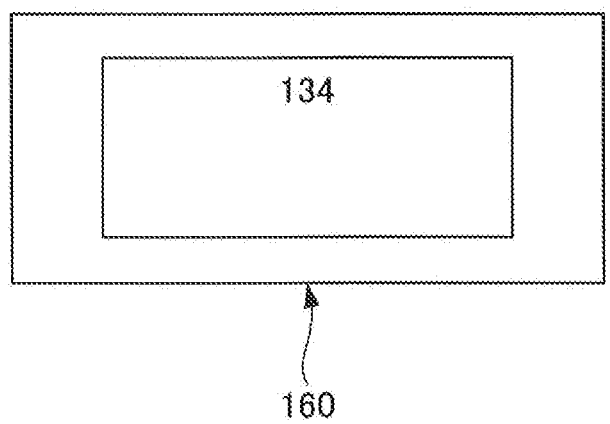
FIGS. 3A and 3B are diagrams illustrating an imaging range and a synthesized image display state of the imaging device according to Example 1.
Figure 3B:
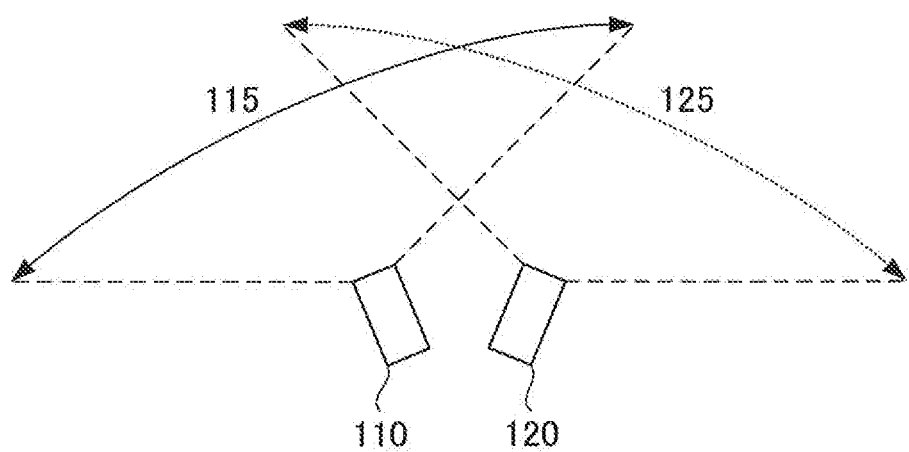

FIGS. 3A and 3B are diagrams illustrating a user interface with which the user designates a region or a position in the imaging device 100 according to this example and a relation between imaging directions of the first imaging unit 110 and the second imaging unit 120.

FIGS. 3A and 3B illustrate a state before the user designates an imaging position. In FIG. 3A, the wide-angle image 134 generated by synthesizing the first image 114 and the second image 124 is displayed in the user interface 160 such as a GUI on the display unit 183. At this time, the first imaging unit 110 and the second imaging unit 120 are assumed to be oriented in an imaging direction illustrated in FIG. 3B.

Here, the user is assumed to designate a position (a center of a region) using a mouse or a cursor in a state in which the wide-angle image 134 is displayed on the display unit 183.

In Example 1, an example of a case in which the user designates the center of the region using a cursor such as an arrow is shown.

Figure 4A:
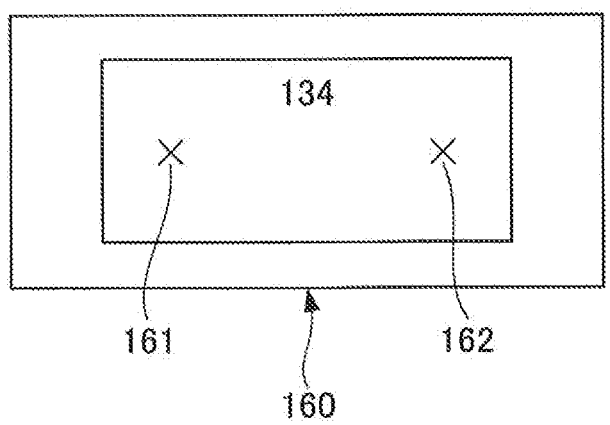
FIGS. 4A to 4C are diagrams illustrating other imaging ranges and image display states of the imaging device according to Example 1.
Figure 4B:
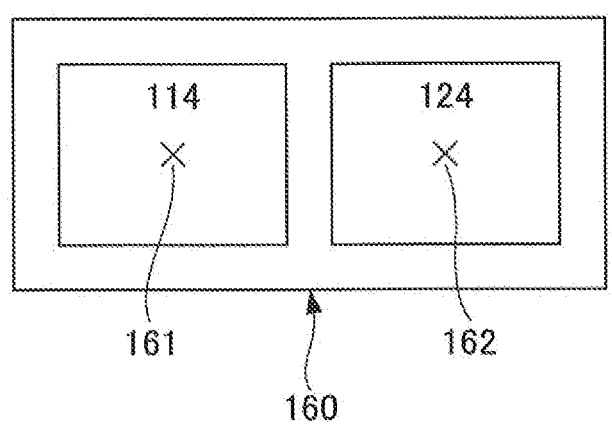

First, as illustrated in FIG. 4A, a case in which the user designates two centers 161 and 162 of the region ranges of the first imaging unit 110 and the second imaging unit 120 as imaging positions will be considered. In this case, it is considered that the user desires to image both the vicinity of the center 161 and the vicinity of the center 162. Accordingly, as illustrated in FIG. 4B the synthesizing unit 140 does not perform synthesizing.

The imaging ranges are changed by changing the imaging directions of the first imaging unit 110 and the second imaging unit 120 so that the first image 114 and the second image 124 are displayed respectively at positions at which the centers 161 and 162 are centered.

Figure 4C:
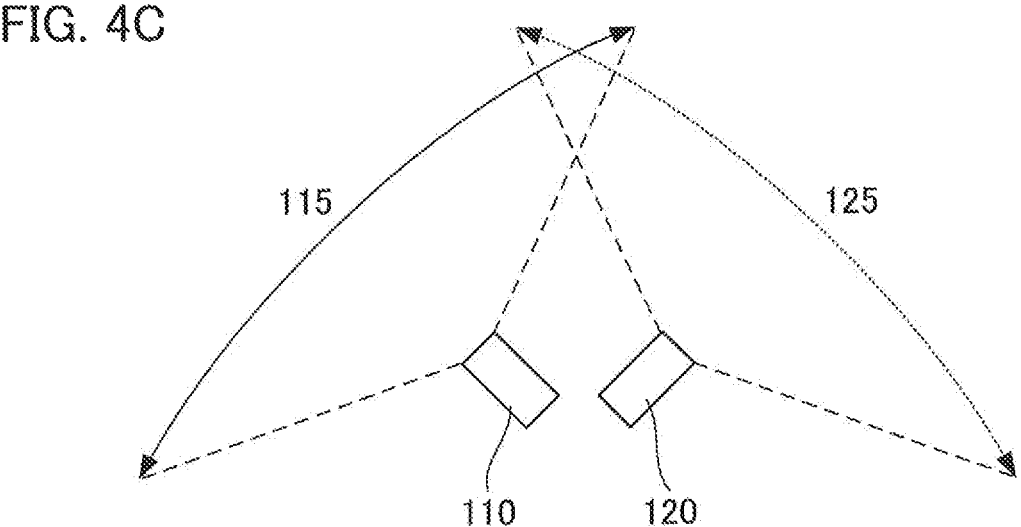

The moved first imaging unit 110 and second imaging unit 120 and the imaging ranges 115 and 125 are illustrated in FIG. 4C. By independently displaying the first image 114 and the second image 124 instead of the wide-angle image 134, it is possible to provide the user with images in a plurality of imaging ranges.

Figure 5A:
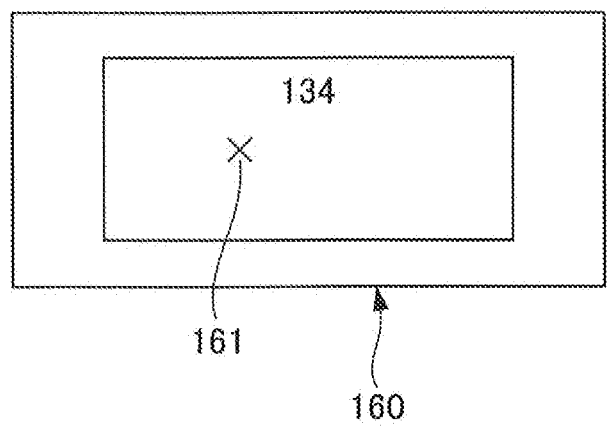
FIGS. 5A to 5C are diagrams illustrating still other imaging ranges and image display states of the imaging device according to Example 1.

As illustrated in FIG. 5A, on the other hand, a case in which the user designates only one center 161 of the region as a position will be considered. In this case, the user is considered to desire to image only the vicinity of the center 161.

Figure 5B:
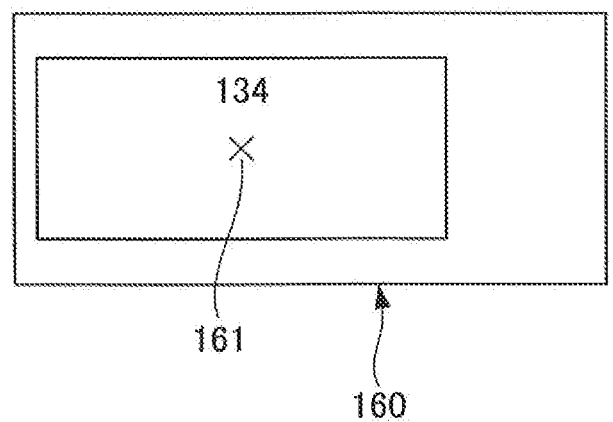

Accordingly, as illustrated in FIG. 5B, the synthesizing unit 140 performs synthesizing and the imaging directions of the first imaging unit 110 and the second imaging unit 120 are moved so that the wide-angle image 134 of the imaging range in which the center 161 is centered is displayed.

Figure 5C:
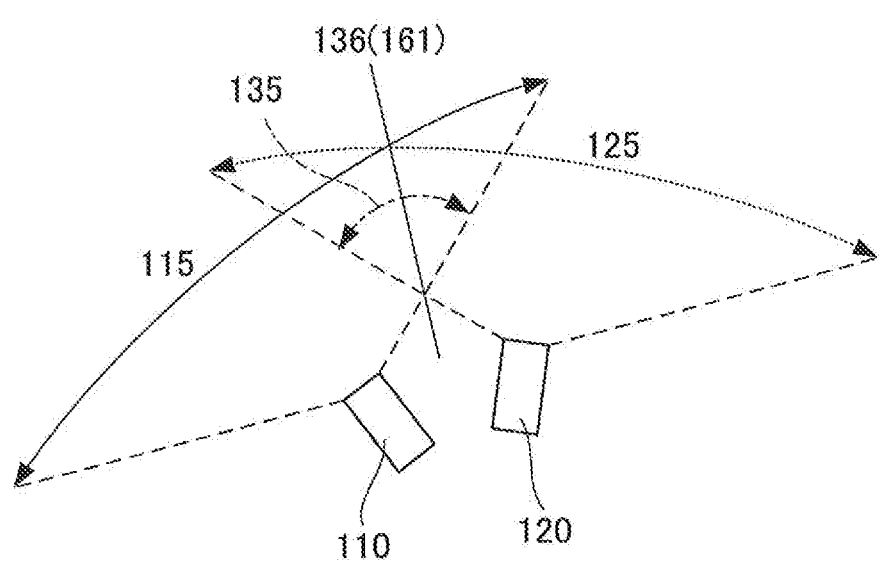

The moved first imaging unit 110 and second imaging unit 120 and the imaging ranges 115 and 125 are illustrated in FIG. 5C. Specifically, the imaging range 115 of the first imaging unit 110 overlaps the imaging range 125 of the second imaging unit 120, and the center of the overlapping range 135 is moved to be located at the center 161.

By performing the control in this way and not displaying the first image 114 and the second image 124 independently but displaying the wide-angle image 134, it is possible to provide the user with an image in a broad imaging range in the vicinity of the center 161.

As illustrated in FIG. 5C, when the sizes of the imaging ranges 115 and 125 are equal, the center 136 of the overlapping range 135 is matched with the center 161 (the imaging position) of the imaging range. Accordingly, it is possible to match the center of a display image of the wide-angle image 134 with the center 161 of the imaging range.

Here, the size of the overlapping range 135 may be a size sufficient for obtaining a position shift amount between the first image 114 and the second image 124. Specifically, the number of pixels in the first image 114 and the second image 124 included in the overlapping range 135 is preferably 100 or more. The size of the overlapping range 135 is further preferably 20% or more of an imaging range which is not relatively broader between the first imaging range 115 and the second imaging range 125.

As described above, the imaging device 100 according to this example changes at least one of the imaging direction of the first imaging unit 110 and the imaging direction of the second imaging unit 120 in accordance with the imaging position designated by the user.

Further, presence or absence of the synthesizing process in the synthesizing unit is changed in accordance with the imaging position designated by the user. In such a configuration, it is possible to control the imaging direction of the imaging device more easily than in the related art at a location which the user desires to monitor and perform appropriate synthesizing control.

FIG. 3A illustrates the example in which the wide-angle image 134 obtained through the synthesizing is displayed in a display state when the user designates the imaging range, but the first image 114 and the second image 124 may be displayed separately.

Until the user designates the imaging range, an image may not be displayed. For example, an indication corresponding to maximum range of the first imaging unit and the second imaging unit may be displayed on the display and the user may designate an imaging range within the indication. When the synthesized wide-angle image is displayed and, for example, all directions (360 degrees) in a pan direction are configured to be covered by a plurality of imaging units (two or three or more imaging units), it is preferable to display all the directions in the pan direction.

Even when the user designates the imaging range once more after designating the imaging range once, the presence or absence of the synthesizing process may be changed in accordance with the number of imaging ranges designated by the user. Specifically, when the user designates one imaging range, the synthesizing process is performed and the wide-angle image 134 is displayed. When the user designates two imaging ranges, the first image 114 and the second image 124 may be displayed separately without performing the synthesizing process.

Whether two imaging ranges are designated is determined in such a manner that, for example, when a click operation of a mouse is performed twice and an interval of two clicks is within a predetermined time interval and the two imaging ranges are separated by a predetermined distance or more, the two imaging ranges are simultaneously designated. On the other hand, when the interval of the two clicks is outside of the predetermined time interval and the two imaging ranges are not separated by the predetermined distance or more, only one imaging range is determined to be designated.

EXAMPLE 2

Next, Example 2 will be described with reference to FIG. 6A to FIG. 8C. An imaging device 200 according to Example 2 is different from the imaging device 100 described in Example 1 in a configuration of first and second driving mechanisms and a configuration of first and second imaging units.

In the imaging device 200, a first imaging unit 210 and a second imaging unit 220 include mechanisms that change zoom magnifications in addition of control of imaging directions. Specifically, an imaging optical system of each imaging unit includes a zoom lens which is movable in an optical axis direction, and a first driving mechanism 211 and a second driving mechanism 221 drive the zoom lenses so that imaging ranges can be controlled in accordance with imaging directions of the imaging units and the zoom magnification.

Further, the other configurations are substantially the same as the configurations of Example 1, and reference numerals in the 100s of the units described in Example 1 are substituted with reference numerals in the 200s in Example 2 for description.

In the imaging device 200, imaging directions of the first imaging unit 210 and the second imaging units 220 and zoom magnifications of the first imaging unit 210 and the second imaging unit 220 are also changed in addition to the presence or absence of the synthesizing process in the synthesizing unit 240 in accordance with an imaging frame designated by a user.

FIGS. 6A to 8C are diagrams illustrating a user interface 260 with which the user designates an imaging frame and a relation between imaging ranges of the first imaging unit 210 and the second imaging unit 220 in the imaging device 200.

Figure 6A:
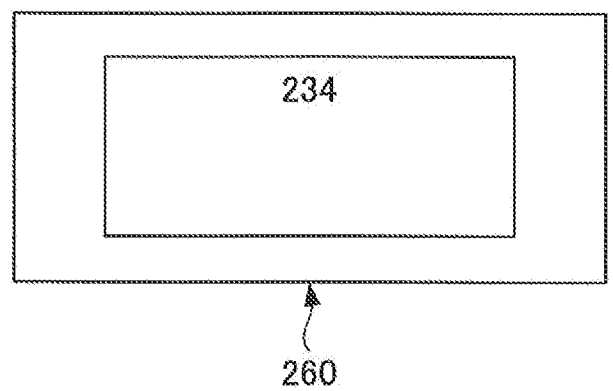
FIGS. 6A and 6B are diagrams illustrating an imaging range and a synthesized image display state of the imaging device according to Example 2.
Figure 6B:
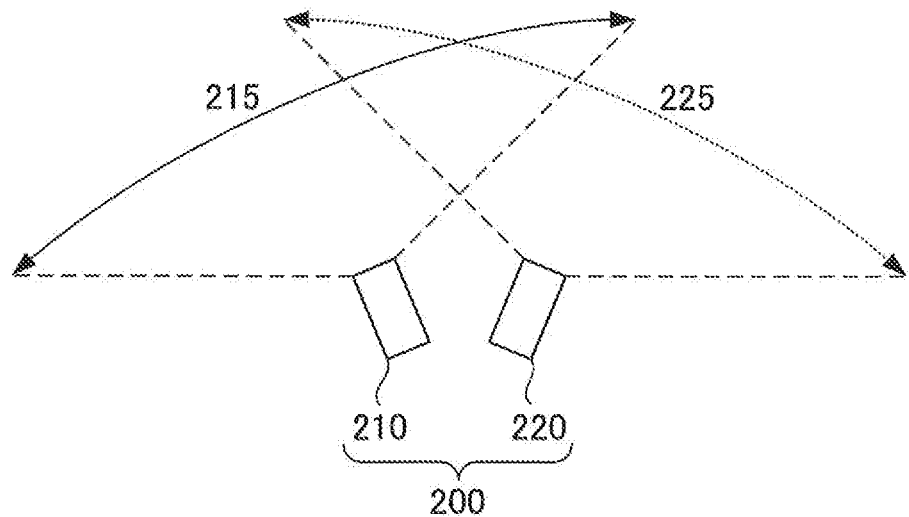

FIGS. 6A and 6B illustrate a display state when the user designates imaging ranges. In FIG. 6A, a wide-angle image 234 generated by synthesizing a first image 214 and a second image 224 is displayed. The first imaging unit 210, the second imaging unit 220, and imaging ranges 215 and 225 at this time are illustrated in FIG. 6B. In FIG. 6B, a state before the user designates the imaging ranges is assumed to be a state in which zoom magnifications of the first imaging unit 210 and the second imaging unit 220 are the smallest (a so-called wide end).

The imaging directions of the first imaging unit 210 and the second imaging unit 220 are controlled so that a synthesized image can display a largest range, that is, an angle difference in a pan direction is the maximum while guaranteeing an overlap necessary to generate the synthesized image.

Here, the user is assumed to designate imaging frames (regions) using a mouse or a cursor on a display screen of the wide-angle image 234. In Example 2, an example of a case in which the user designates imaging frames with, for example, rectangular frames is shown.

Figure 7A:
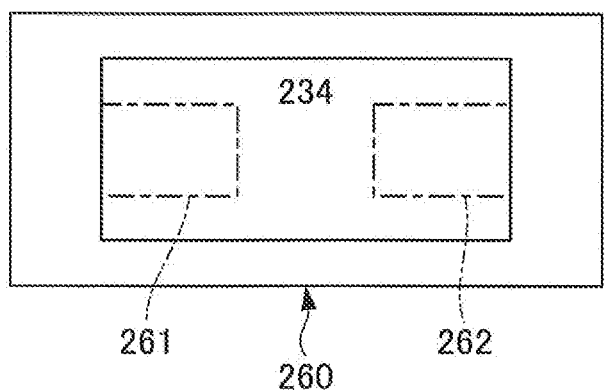
FIGS. 7A to 7C are diagrams illustrating other imaging ranges and image display states of the imaging device according to Example 2.

First, as illustrated in FIG. 7A, a case in which the user designates imaging frames as two rectangular imaging frames 261 and 262 using a mouse or the like is considered.

Figure 7B:
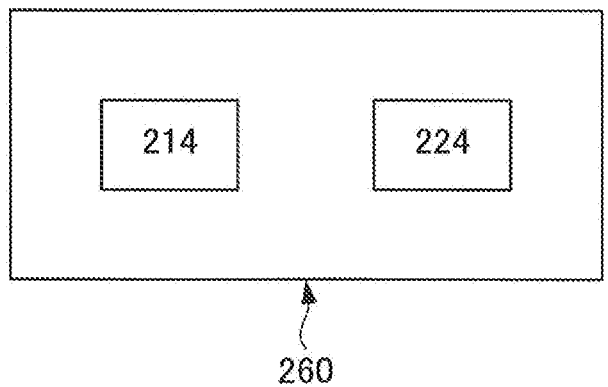

In this case, the user is considered to desire to image the ranges of the two rectangular imaging frames 261 and 262. Accordingly, as illustrated in FIG. 7B, the synthesizing unit 240 does not perform synthesizing. Then, the imaging ranges of the first imaging unit 210 and the second imaging unit 220 are changed through control of the imaging directions and the control of the zoom magnifications so that the first image 214 and the second image 224 in the subject ranges corresponding to the imaging frames 261 and 262 are displayed separately.

Figure 7C:
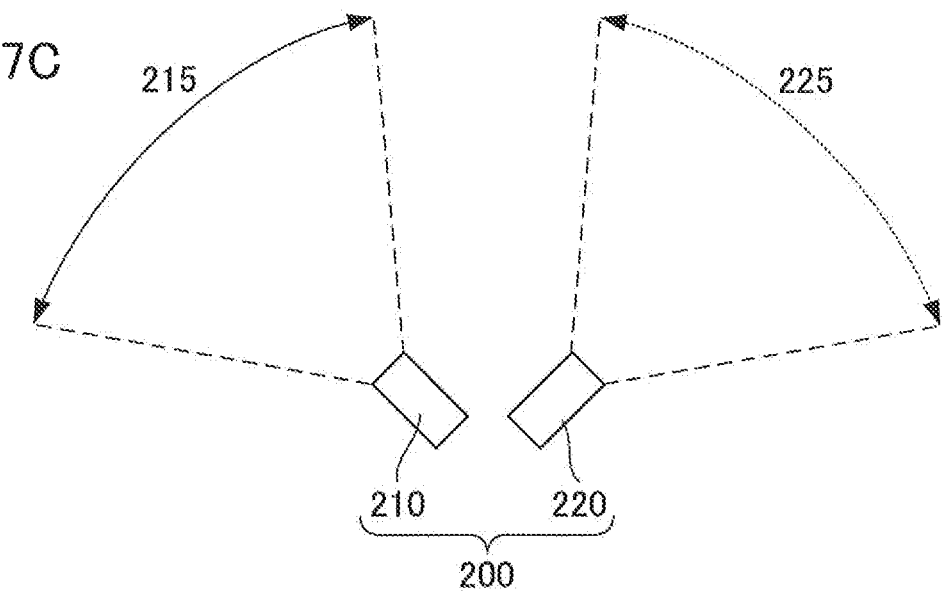

The first imaging unit 210, the second imaging unit 220, and the imaging ranges 215 and 225 after the control of the imaging directions and the zoom magnifications are illustrated in FIG. 7C. Compared to the state of FIG. 6B, both the imaging direction and the zoom magnification (an angle of field) of each imaging unit are changed. Further, by separately displaying the first image 214 and the second image 224 instead of the wide-angle image 234, it is possible to display the images in a plurality of imaging ranges for the user.

Figure 8A:
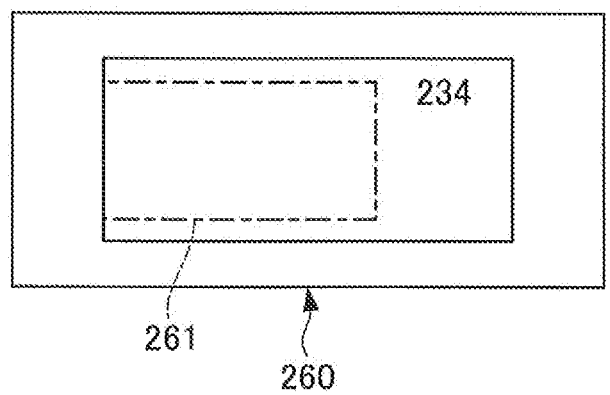
FIGS. 8A to 8C are diagrams illustrating still other imaging ranges and image display states of the imaging device according to Example 2.
Figure 8B:
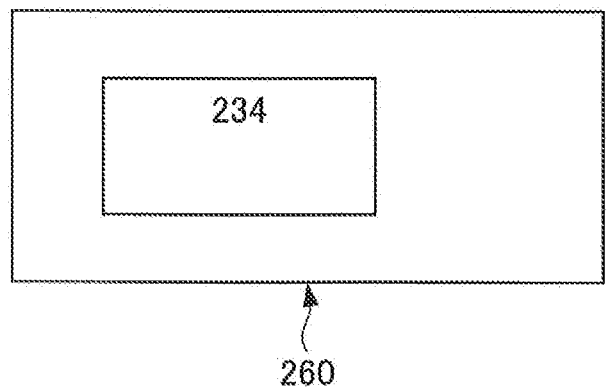

On the other hand, as illustrated in FIG. 8A, a case in which the user designates only one rectangular imaging frame 261 is considered. In this case, an imaging range which the user desires to image is considered to be the range of only the rectangular imaging frame 261. Accordingly, as illustrated in FIG. 8B, the synthesizing unit 240 performs synthesizing and changes the imaging ranges by controlling the imaging directions and the zoom magnifications of the first imaging unit 210 and the second imaging unit 220 so that the wide-angle image 234 obtained by imaging the range of the imaging frame 261 is displayed.

Figure 8C:
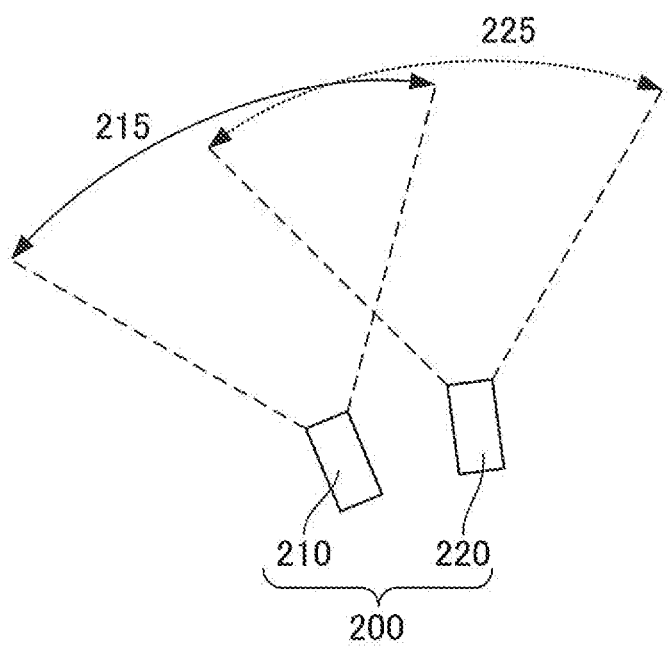

The first imaging unit 210, the second imaging unit 220, and the imaging ranges 215 and 225 after the control of the imaging directions and the zoom magnifications are illustrated in FIG. 8C. Compared to the state of FIG. 6B, both the imaging direction and the zoom magnification of each imaging unit are changed. Specifically, the imaging range 215 of the first imaging unit 210 overlaps the imaging range 225 of the second imaging unit 220, and a sum of sets of the imaging ranges 215 and 225 is moved to match the imaging frame 261.

Thus, when the range of the imaging frame 261 is divided and imaged with the first imaging unit 210 and the second imaging unit 220 and is displayed as the wide-angle image 234 obtained by synthesizing the acquired first image 214 and second image 224, it is possible to obtain the following advantage.

First, a case in which the range of the imaging frame 261 exceeds a largest angle of field (an angle of field of a wide end) of the first imaging unit 210 and the second imaging unit 220 will be described. In this case, the range of the imaging frame 261 cannot be imaged by each single imaging unit.

Accordingly, when the range of the imaging frame 261 is displayed without performing the synthesizing process, a part of the range of the imaging frame 261 is displayed as the first image 214 and another part is displayed as the second image 224.

On the other hand, in order to improve visibility of the overlapping range, it is more preferable to display the range of the imaging frame 261 as the wide-angle image 234 than to display the first image 214 and the second image 224 independently.

In other words, by performing the synthesizing process even when the range of the imaging frame 261 exceeds the angle of field of the wide end of each imaging unit, it is possible to improve visibility in which the imaging range exceeding the angle of field of the wide end is displayed as a single wide-angle image.

Next, a case in which the range of the imaging frame 261 does not exceed the broadest angle of field (the angle of field of the wide end) of the first imaging unit 210 and the second imaging unit 220 will be described. In this case, the range of the imaging frame 261 can be imaged by each imaging unit as the single unit. That is, it is possible to display the range of the imaging frame 261 as a single image even when the synthesizing process is not performed.

Here, in order to improve a resolution of an image, it is more preferable to divide and image the range of the imaging frame 261 with the first imaging unit 210 and the second imaging unit 220 and display the range of the imaging frame 261 as the wide-angle image 234 obtained by synthesizing the acquired first image 214 and second image 224.

As described above, when the range of only one imaging frame 261 is designated, the first image 214 and the second image 224 are not independently displayed. By displaying the wide-angle image 234, it is possible to broaden the imaging range which can be displayed as a single image or improve the resolution of the imaging range.

FIG. 6B illustrates an example in which the imaging ranges of the first imaging unit 210 and the second imaging unit 220 are set at the largest angle of field (a so-called wide end) in the state before the user designates the imaging frame, but the imaging ranges may not be set at the wide end.

When the user designates the imaging frame and a range which the user desires to image is narrowed from a state in which the imaging range is the largest, the imaging range can be easily designated. Therefore, it is preferable to set the range at the wide end.

EXAMPLE 3

Next, an imaging device 300 according to Example 3 is different from the imaging device 200 described in Example 2 in a configuration of first and second driving mechanisms. In the imaging device 300, a first imaging unit 310 and a second imaging unit 320 are rotated in two directions perpendicular to each other.

Specifically, a turning mechanism (a so-called tilt driving mechanism) capable of controlling an angle about the Z axis of FIG. 1 is included in addition to a turning mechanism (a so-called pan driving mechanism) about the Z axis (a vertical axis). Further, the other configurations are substantially the same as the configurations of Example 2, and reference numerals in the 200s of the units described in Example 2 are substituted with reference numerals in the 300s in Example 3 for description.

FIG. 9 is a diagram illustrating a user interface 360 with which a user designates an imaging frame in the imaging device 300. In the imaging device 300, a state before the user designates an imaging frame and a method of designating the imaging frame are the same as those in the imaging device 200.

When the user designates two imaging frames, a first image 314 and a second image 324 corresponding to the ranges of the imaging frames designated by the user are displayed. In this way, imaging directions or zoom magnifications of the first imaging unit 310 and the second imaging unit 320 are controlled.

Figure 9B:
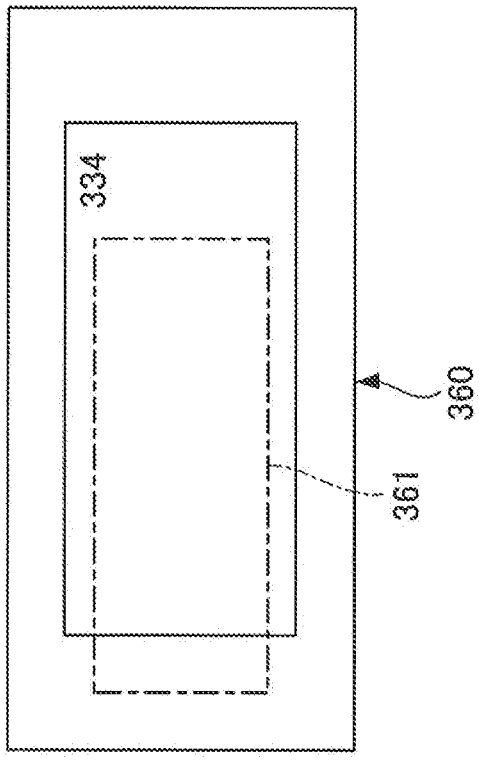
FIGS. 9A to 9D are diagrams illustrating user interfaces of an imaging device according to Example 3.

On the other hand, in Example 3, a case in which the user designates the imaging frames with only one rectangular imaging frame 361 will be considered. In this case, as illustrated in FIGS. 9A and 9B, the range of the imaging frame 361 is divided and imaged with the first imaging unit 310 and the second imaging unit 320, and is displayed as a wide-angle image 334 obtained by synthesizing the acquired first image 314 and second image 324. Here, imaging directions of the first imaging unit 310 and the second imaging unit 320 differ in accordance with a form of the imaging frame 361 designated by the user.

For example, a case in which an aspect ratio of a length of the imaging frame 361 in a tilt direction (the vertical direction of FIG. 9A) to a length thereof in a pan direction (the horizontal direction of FIG. 9A) is equal to or greater than a first threshold (for example, a vertically long case) is considered. In this case, as in FIG. 9C, the range of the imaging frame 361 is divided in the tilt direction and imaged with the first imaging unit 310 and the second imaging unit 320.

Here, an aspect ratio is a value obtained by dividing a vertical length by a horizontal length. For example, a region indicated by a one-dot chain line in FIG. 9C is a region equivalent to the imaging range 315 of the first imaging unit 310 and a region indicated by a two-dot chain line is a region equivalent to the imaging range 325 of the second imaging unit 320.

Figure 9D:
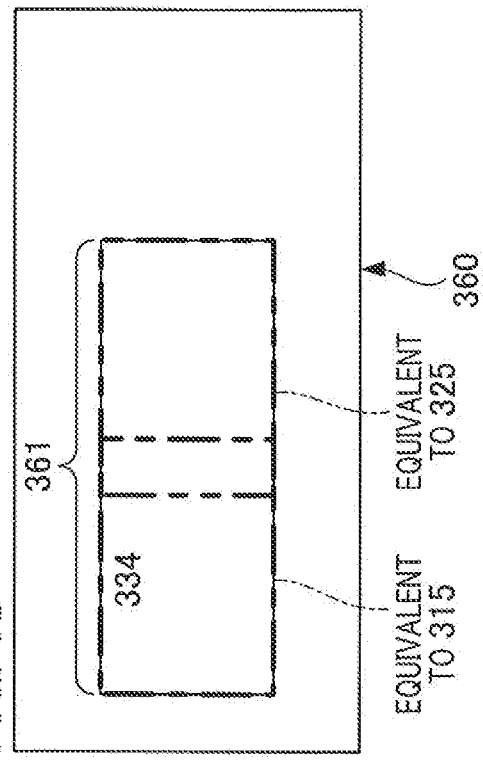
Figure 9A:
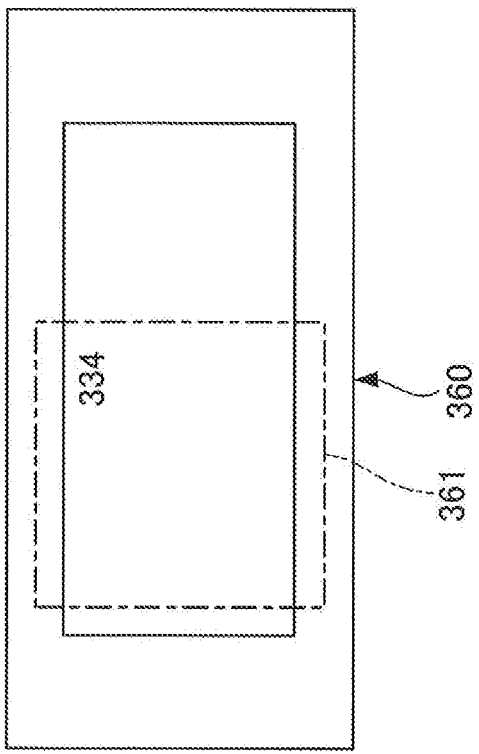
Figure 9C:
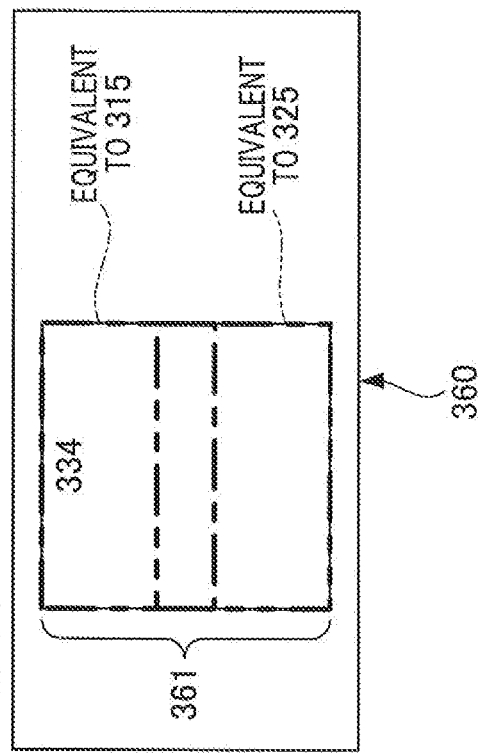

That is, in FIG. 9C, the imaging ranges (the imaging directions and the zoom magnifications) of the first imaging unit 310 and the second imaging unit 320 are controlled such that the imaging ranges of the first imaging unit 310 and the second imaging unit 320 in the pan direction are the same and only the imaging ranges in the tilt direction are different.

On the other hand, a case in which an aspect ratio of a length of the imaging frame 361 in the tilt direction (the vertical direction of FIG. 9B) to the length thereof in the pan direction (the horizontal direction of FIG. 9B) is less than the first threshold (for example, a horizontally long case) is considered. In this case, as in FIG. 9D, the range of the imaging frame 361 is divided in the pan direction and imaged with the first imaging unit 310 and the second imaging unit 320.

A region indicated by a one-dot chain line in FIG. 9D is a region equivalent to the imaging range 315 of the first imaging unit 310 and a region indicated by a two-dot chain line is a region equivalent to the imaging range 325 of the second imaging unit 320.

That is, in FIG. 9D, the imaging directions of the first imaging unit 310 and the second imaging unit 320 are controlled such that the imaging ranges of the first imaging unit 310 and the second imaging unit 320 in the tilt direction are the same and only the imaging ranges in the pan direction are different.

In this way, by changing the division direction of the imaging range in accordance with a ratio of the length of the imaging range in the tilt direction to the length thereof in the pan direction, it is possible to further broaden a range which can be displayed as a single image or further improve a resolution of the imaging range.

The foregoing first threshold may be determined in accordance with the aspect ratio of the imaging range of each imaging unit.

Specifically, an average value of the aspect ratio of the imaging range of the first imaging unit 310 and the aspect ratio of the second imaging unit 320 may be set as the first threshold.

The first threshold may deviate by about 20% from the average value of the aspect ratio of the imaging range of the first imaging unit 310 and the aspect ratio of the second imaging unit 320. That is, the first threshold is preferably equal to or greater than 0.8 times and equal to or less than 1.2 times the average value of the aspect ratio of the imaging range of the first imaging unit 310 and the aspect ratio of the second imaging unit 320.

Since the aspect ratio of the imaging range of each imaging unit is not changed in accordance with the zoom magnification, the aspect ratio can be uniquely defined irrespective of the size of the imaging range.

EXAMPLE 4

An imaging device 400 according to Example 4 is different from the imaging device 300 described in Example 3 in a configuration of first and second driving mechanisms. The imaging device 400 can control imaging directions and imaging ranges of a first imaging unit 410 and a second imaging unit 420 and includes a turning mechanism (a so-called rotational mechanism) capable of rotating an imaging surface of each imaging unit about an optical axis of the imaging unit.

Further, the other configurations are substantially the same as the configurations of Example 3, and reference numerals in the 300s of the units described in Example 3 are substituted with reference numerals in the 400s in Example 4 for description.

FIG. 10 is a diagram illustrating a user interface 460 with which a user designates an imaging frame in the imaging device 400. In the imaging device 400, an operation in which the user designates two imaging frames in a state before the user designates an imaging frame and a method of designating the imaging frame is the same as the operation in the imaging device 200 or the like, and thus description thereof will be omitted as in the imaging device 300.

On the other hand, a case in which the user designates one rectangular imaging frame 461 as the imaging frame will be considered.

In this case, the range of the imaging frame 461 is divided and imaged with the first imaging unit 410 and the second imaging unit 420 and is displayed as a wide-angle image 434 obtained by synthesizing the acquired first image 414 and second image 424.

Here, imaging directions of the first imaging unit 410 and the second imaging unit 420 are changed in accordance with a form of the imaging frame 461 designated by the user. Further, in this example, the imaging directions of the first imaging unit 410 and the second imaging unit 420 and a rotational angle (an angle of an imaging surface) differ in accordance with the form of the imaging frame 461 designated by the user.

In general, a solid-state image sensor in an imaging unit used for surveillance has a length in the horizontal direction longer than a length in the vertical direction in many cases. Accordingly, when the imaging unit is rotated about an optical axis, an imaging range of the imaging unit changes.

Accordingly, the shape of the imaging frame 461 is easily adjusted by controlling the imaging direction and the rotational direction as follows in accordance with a ratio (an aspect ratio) of a length of the imaging frame 461 in the tilt direction to the length thereof in the pan direction.

A case in which the ratio of the length of the imaging frame 461 in the tilt direction to the length thereof in the pan direction is greater than the first threshold and equal to or greater than a second threshold will be considered. At this time, as in FIG. 10A, the range of the imaging frame 461 is divided and imaged in the tilt direction with the first imaging unit 410 and the second imaging unit 420. Each imaging unit is rotated by 90 degrees to be vertically long so that the lengths of the imaging ranges 415 and 425 of the imaging units in the tilt direction are long.

Next, a case in which the ratio of the length of the imaging frame 461 in the tilt direction to the length thereof in the pan direction is equal to or greater than the first threshold and less than the second threshold will be considered. At this time, as in FIG. 10B, the range of the imaging frame 461 is divided and imaged in the tilt direction with the first imaging unit 410 and the second imaging unit 420.

In the imaging ranges 415 and 425 of the imaging units, the length in the pan direction is longer than the length in the tilt direction to be horizontally long, and each imaging unit is not rotated.

Next, a case in which the ratio of the length of the imaging frame 461 in the tilt direction to the length thereof in the pan direction is less than the first threshold and equal to or greater than a third threshold will be considered. The third threshold is less than the first threshold.

Figure 10C:
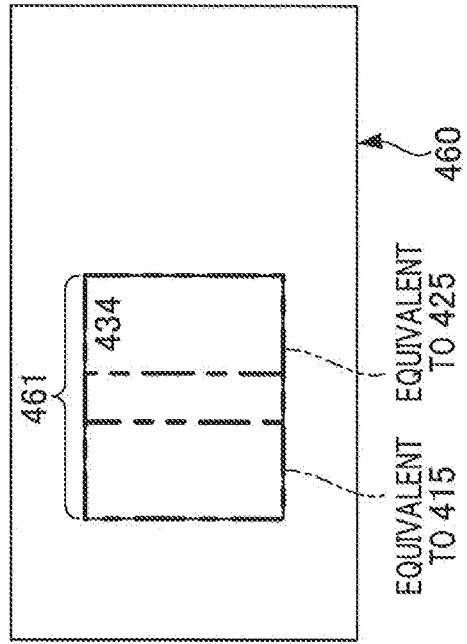
FIGS. 10A to 10D are diagrams illustrating user interfaces of an imaging device according to Example 4.

At this time, as in FIG. 10C, the range of the imaging frame 461 is divided and imaged in the pan direction with the first imaging unit 410 and the second imaging unit 420. However, each imaging unit is rotated by 90 degrees to be vertically long so that the lengths of the imaging ranges 415 and 425 of the imaging units in the tilt direction are long.

Finally, a case in which the aspect ratio of the tilt direction (the length in the vertical direction in FIG. 10A) of the imaging frame 461 to the pan direction (the length in the horizontal direction in FIG. 10A) is less than the third threshold will be considered.

Figure 10D:
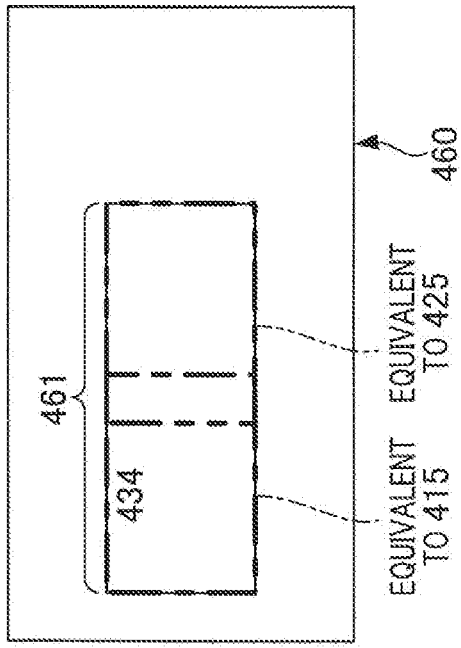
Figure 10A:
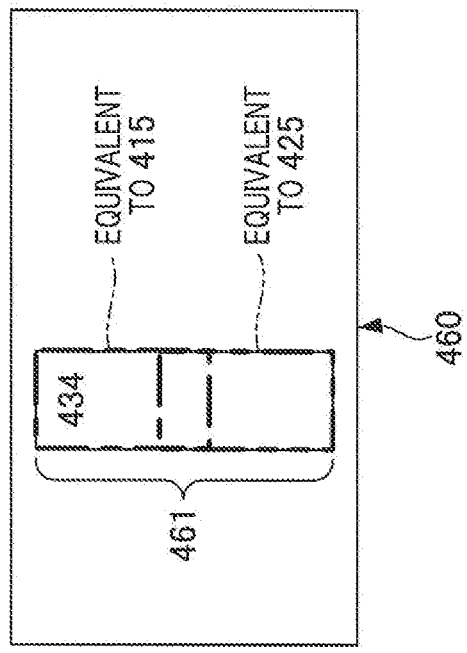
Figure 10B:
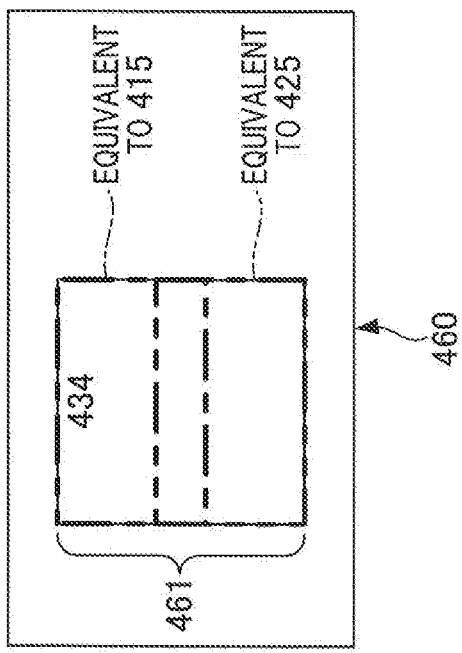

At this time, as in FIG. 10D, the range of the imaging frame 461 is divided and imaged in the pan direction with the first imaging unit 410 and the second imaging unit 420.

Each imaging unit is not rotated with the lengths of the imaging ranges 415 and 425 of the imaging units in the pan direction remaining horizontally long.

In FIGS. 10A to 10D, the region indicated by the one-dot chain line is the region equivalent to the imaging range 415 of the first imaging unit 410 and the region indicated by the two-dot chain line is the region equivalent to the imaging range 425 of the second imaging unit 420.

In this way, by performing the control at the rotational angle of the imaging surface of each imaging unit about each optical axis thereof in addition to the imaging direction and the imaging range of each imaging unit, it is possible to further broaden a range which can be displayed as a single image or further improve a resolution of the imaging range.

The foregoing second and third thresholds may also be determined in accordance with the aspect ratio of the imaging range of each imaging unit. Specifically, the second threshold is preferably equal to or greater than 1.4 times and equal to or less than 2.8 times the first threshold and the third threshold is preferably equal to or greater than 0.35 times and equal to or less than 0.7 times the first threshold.

EXAMPLE 5

In Examples 1 to 4, the imaging device that includes two imaging units, that is, the first and second imaging units, has been described, but the imaging device may include three or more imaging units. That is, one or more imaging unit may further be included in addition to the first and second imaging units. This is preferable because flexible countermeasures for a request from a user can be taken as the number of imaging units is more.

The imaging device 500 described in Example 5 includes four imaging units, a third imaging unit and a fourth imaging unit in addition to a first imaging unit 510 and a second imaging unit 520.

Each imaging unit is able to control all of pan, tilt, zoom, and rotation as in the imaging unit of the imaging device 400 described in Example 4.

Further, the other configurations are substantially the same as the configurations of Example 4, reference numerals 400s of the units described in Example 4 are substituted with reference numerals of 500s in Example 5 for description.

FIG. 11 is a diagram illustrating a user interface 560 with which a user designates an imaging frame in the imaging device 500.

First, a case in which the user designates the same number (in this case, four) of imaging frames as the number of imaging units included in the imaging device 500 as rectangular imaging frames 561, 562, 563, and 564 will be considered.

In this case, as in FIG. 11A, imaging directions, imaging ranges, and rotational angles of the first imaging unit 510, the second imaging unit 520, the third imaging unit, and the fourth imaging unit are controlled such that each imaging frame becomes an imaging range. In this case, the synthesizing unit does not perform the synthesizing process on any image.

Next, a case in which the user designates a number M (where M>N) of imaging frames which is greater than the number N of imaging units included in the imaging device 500 will be considered. FIG. 11B illustrates a case in which the user designates five imaging frames (M=5), that is, the imaging frames 561, 562, 563, 564, and 565. In this case, one imaging unit images the ranges of any two imaging frames.

Therefore, as in FIG. 11C, one imaging unit images the ranges of two imaging frames 561 and 562 in which a distance between the centers of the imaging frames is the closest. An imaging direction, an imaging range, and a rotational angle of the imaging device are controlled such that the three remaining imaging units image the imaging frames 563, 564, and 565.

That is, the imaging range of one predetermined imaging unit is controlled such that at least two imaging frames or imaging positions are included in the imaging range of the predetermined imaging unit.

At this time, all the imaging ranges of the imaging units that image the imaging frames 561 and 562 are not displayed and only image portions corresponding to the imaging frames 561 and 562 may be cut out and displayed.

In this case, images of the cut frames may be expanded and displayed. When the user designates six or more imaging frames, the number of imaging frames taken charge of by one imaging unit may be changed in accordance with a difference between the number of imaging frames designated by the user and the number of imaging units included in the imaging device.

FIG. 11B illustrates a case in which the number of frames designated by the user may be greater than the number of imaging units by one (where M−N=1), but the number of frames designated by the user is greater than the number of imaging units by two or more. In the foregoing example, the control is performed such that the ranges of the plurality of imaging frames in which a distance between the centers of the imaging frames is the closest are imaged by one imaging unit.

However, for example, an area of rectangular shapes of the plurality of imaging frames may be calculated for every plural imaging frames, the ranges of the plurality of imaging frames of which the rectangular area is the minimum may be selected, and the ranges may be imaged by one imaging unit. An imaging range which can be controlled by each of the plurality of imaging units (a range in which an imaging direction can be changed or a range in which a zoom magnification can be changed) may be stored in a memory.

Information such as control characteristics (a speed or the like when an imaging direction or a zoom is changed) of each of the plurality of imaging units, the number of pixels, or a current imaging range may be stored in advance in the memory. Then, based on such information, a plurality of imaging frames and one imaging unit imaging the plurality of imaging frames may be determined in order to realize a shortest time or an optimum image quality. Accordingly, a time necessary for the control can be shortened or the image quality can be optimized.

In this case, the imaging direction, the imaging range, and the rotational angle of the imaging device may be controlled such that one imaging unit preferentially images the ranges from the ranges in which the distance between the centers of the imaging frames is the closest. That is, when the difference between the number of imaging frames designated by the user and the number of imaging units is referred to as a first number, one imaging unit images up to the first number of imaging frames in sequence from the imaging frames in which the distance between the centers of the imaging frames is the closest.

Then, each imaging unit is driven so that each imaging unit images each of the other imaging frames.

Even in this case, the synthesizing unit does not perform the synthesizing process on any image.

That is, when M−N>1, for example, ranges of three or more imaging frames close to each other among M imaging frames are imaged by one imaging device. Alternatively, any pair of two imaging frames close to each other among M imaging frames is selected and a range of each pair of imaging frames is imaged by each respective imaging device. Alternatively, both is synthesized.

Next, a case in which the user designates the number of imaging frames less than the number of imaging units included in the imaging device 500 will be considered. In this case, at least one imaging frame can be divided and imaged with a plurality of imaging units. An imaging frame which is divided and imaged with a plurality of imaging units may be determined as follows.

Figure 12A:
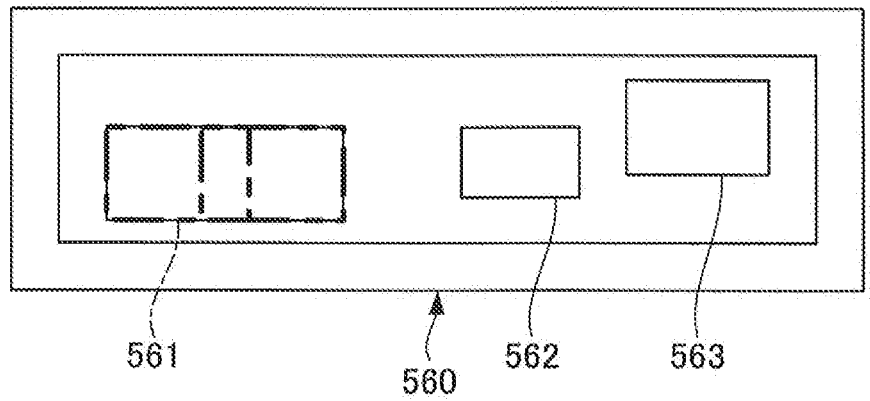
FIGS. 12A to 12C are diagrams illustrating other examples of the user interfaces of the imaging device according to Example 5.

A first method is a method of preferentially dividing and imaging a frame with a large size (area). FIG. 12A illustrates a case in which the user designates three imaging frames, that is, the imaging frames 561, 562, and 563. The size (area) of the imaging frame 561 is larger than the sizes of the imaging frames 562 and 563. In this case, the imaging frame 561 is divided and imaged with two imaging units and an image obtained by imaging the range of the imaging frame 561 is displayed as an image obtained by synthesizing two images.

On the other hand, the imaging frames 562 and 563 are independently imaged by two remaining imaging units, respectively. How the imaging frame 561 is divided and imaged may be determined at a ratio of the length of the imaging frame 561 in the tilt direction to the length thereof in the pan direction, as described in Example 3 or 4.

That is, when the number of imaging frames designated by the user is less than the number of imaging units, a difference between the number of imaging frames designated by the user and the number of imaging units is referred to as a second number. At this time, each of the second number of imaging frames may be divided and imaged in sequence from the imaging frames in which the sizes of the imaging frames designated by the user are large.

Alternatively, each imaging frame may be divided and imaged in sequence from the imaging frames designated by the user to improve a resolution.

When the user designates two imaging frames, that is, the imaging frames 561 and 562, it is possible to select whether each imaging frame is divided and imaged with two imaging units or one of the imaging frames is imaged with one imaging unit and the other imaging frame is imaged with three imaging units.

In this case, in accordance with the size of the imaging frame 561 and the size of the imaging frame 562, a method to be used may be determined or the imaging frame designated by the user may be divided and imaged.

Figure 12B:
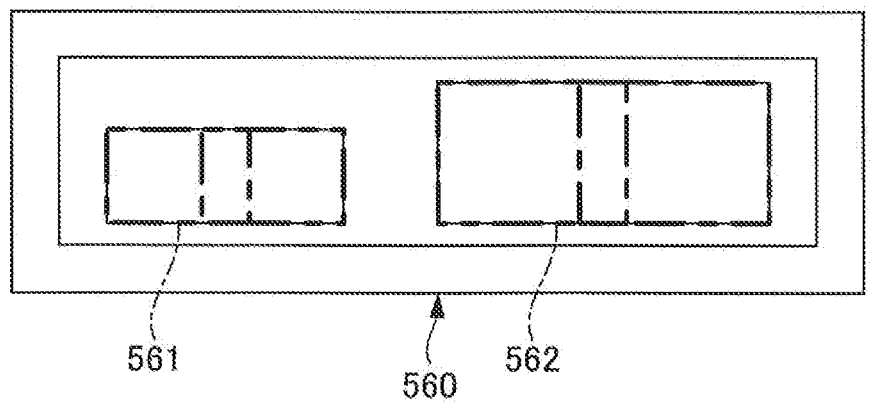

Specifically, as in FIG. 12B, when a difference between the sizes of the imaging frames 561 and 562 is less than a fourth threshold, each of the imaging frames 561 and 562 is divided and imaged with two imaging units.

Figure 12C:
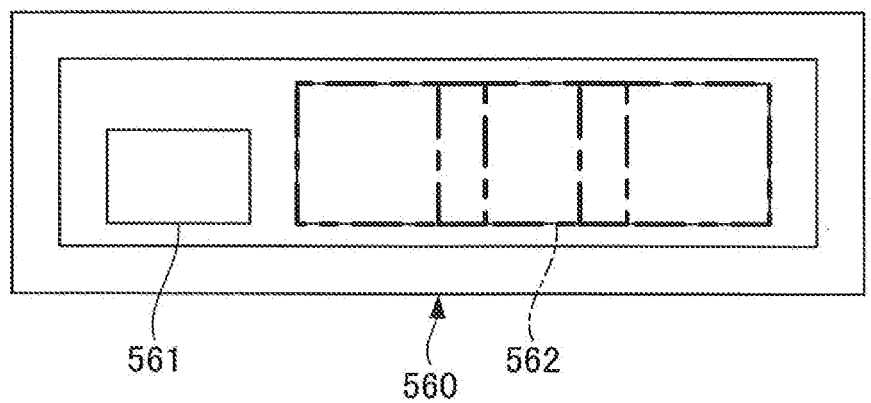

On the other hand, as in FIG. 12C, when a difference between the sizes of the imaging frames 561 and 562 is equal to or greater than a fourth threshold, a larger imaging frame (in the drawing, the imaging frame 562) may be divided and imaged with three imaging units and a smaller imaging frame (in the drawing, the imaging frame 561) may be imaged with one imaging unit.

The difference between the sizes may be defined as a ratio of the size of the imaging frame with a smaller area to the size of the imaging frame with a larger area between the two imaging frames. The fourth threshold is preferably greater than ⅓ and less than 1 and is further preferably ½.

That is, when the number of imaging frames designated by the user is equal to or greater than the number of imaging units by two, a ratio of the size of the imaging frame to the number of imaging units with which the imaging frame is divided and imaged is obtained for each imaging frame. The number of imaging units with which each imaging frame is divided and imaged may be determined so that a dispersion of the ratio is the smallest.

A second method is a method of determining the imaging frame to be divided in response to a request from the user.

When the user designates two imaging frames, that is, the imaging frames 561 and 562, it may be selected whether each imaging frame is divided and imaged with two imaging units or one of the imaging frames is imaged with one imaging unit and the other imaging frame is imaged with three imaging units. At this time, the user is allowed to select the imaging frame of which a resolution of the imaging range is to be improved, through the user interface. The imaging frame of which the resolution is to be improved is divided and imaged with three imaging units and the other imaging frame is imaged with one imaging unit.

In such a configuration, this is preferable because flexible countermeasures for a request from the user can be taken, for example, a resolution of a range desired to be imaged with a high resolution among the plurality of imaging frames is preferentially improved.

The imaging device may have a configuration in which two imaging units or three or more imaging units are included and all the directions of 360 degrees can be imaged when the imaging ranges are linked in the pan direction.

In this case, as a display state when the user designates the imaging frames, a wide-angle image obtained by imaging all the directions of 360 degrees is preferable. This is because, as described above, when the user designates the imaging frame and a range which the user desires to image is narrowed from a state in which the imaging range is the largest, the imaging range can be easily designated.

EXAMPLE 6

In Examples 1 to 5 described above, the examples in which each imaging unit in the imaging device is moved actually when the user designates the imaging frame have been described. However, to image a desired imaging range in accordance with the imaging frame designated by the user without automatically moving the imaging unit, a guide indicating where each imaging unit should be moved may be displayed. Such guide may include light-emitting elements 670 installed on the imaging device 600, or a guide display on the screen of the display unit.

Next, an imaging device 600 according to Example 6 will be described with reference to FIGS. 13A to 13D. The imaging device 600 is different from the imaging device 100 described in Example 1 in that a plurality of light-emitting elements 670 serving as display elements that indicate a location to which each imaging unit is moved for the user are included.

The light-emitting elements 670 are configured as LEDs and, for example, sixteen light-emitting elements 670 are disposed along the outer circumference of the imaging device 600 in the XY plane. A control unit controls each light-emitting element 670 such that the light-emitting element is turned on or off. Further, the other configurations are substantially the same as the configurations of Example 1, and reference numerals in the 100s of the units described in Example 1 are substituted with reference numerals in the 600s in Example 6 for description.

FIGS. 13A to 13D are diagrams illustrating a user interface with which a user designates imaging frames and a relation between ON and OFF of each light-emitting element in the imaging device 600.

In the imaging device 600, since a state before the user designates the imaging frames and a method of designating the imaging frames are the same as those of the imaging device 100, illustration is omitted.

Figure 13A:
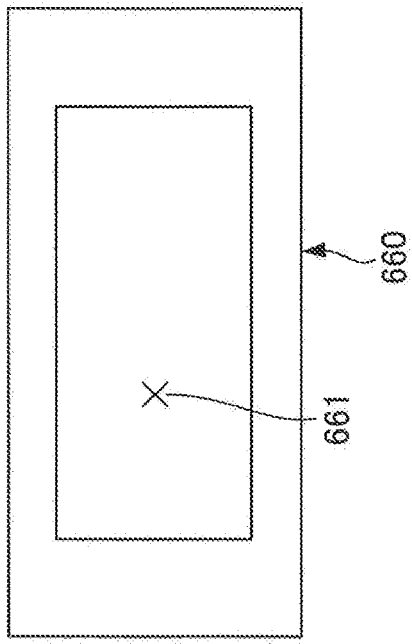
FIGS. 13A to 13D are diagrams illustrating user interfaces of an imaging device according to Example 6.

As illustrated in FIG. 13A, a case in which the user designates two centers 661 and 662 of an imaging range as imaging positions will be considered. In this case, since the user is considered to image both the vicinity of the center 661 and the vicinity of the center 662, the synthesizing unit 640 does not perform synthesizing.

Figure 13C:
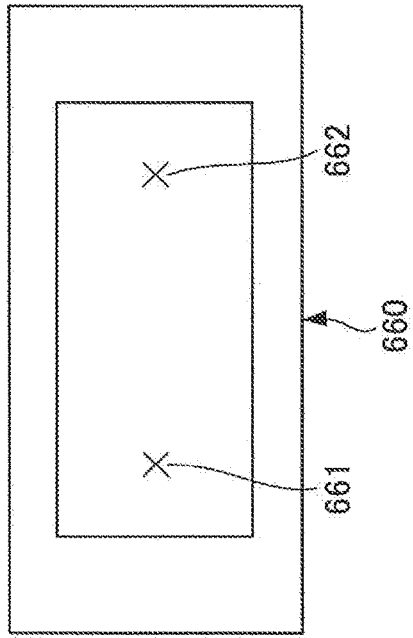
Figure 13B:
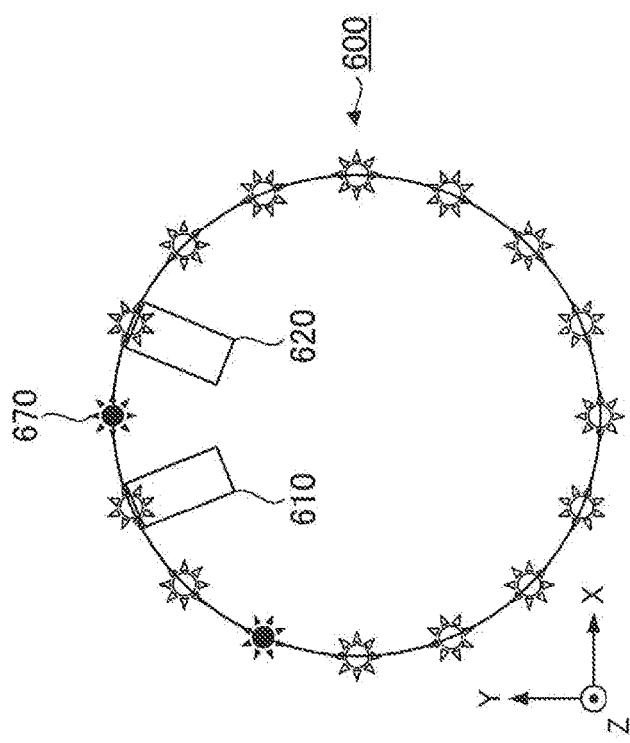

As illustrated in FIG. 13B, when a direction of each imaging unit is changed, only LEDs at positions at which a first image 612 and a second image 624 are displayed centering on the centers 661 and 662, respectively, are turned on.

In FIG. 13B, LEDs painted with black are LEDs which are turned on. The user directs each imaging unit in the directions in which the LEDs are turned on.

On the other hand, as illustrated in FIG. 13C, a case in which the user designates only one center 661 of the imaging range as an imaging position will be considered.

Figure 13D:
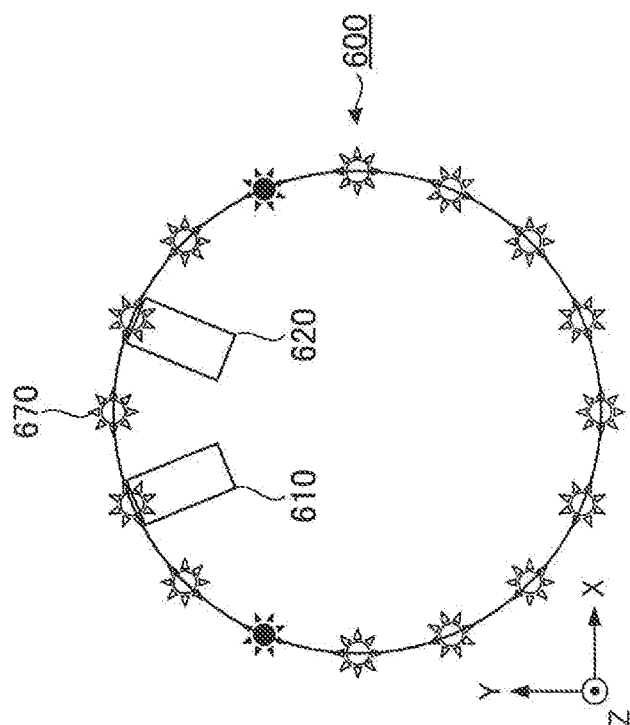

In this case, since the user is considered to desire to image only the vicinity of the center 661, the synthesizing unit 640 performs synthesizing. As illustrated in FIG. 13D, only LEDs at positions indicating directions of the imaging units 610 and 620 are turned on.

Accordingly, when images of the imaging units 610 and 620 of which the directions are changed are synthesized, a wide-angle image 634 in which the center 661 is centered is displayed. In FIG. 13D, LEDs painted with black are LEDs which are turned on.

The user can depend on the LEDs which are turned on to move each imaging unit to a desired angle position. Then, when the user actually moves each imaging unit to positions at which the first image 614 and the second image 624 are displayed centering on the centers 661 and 662, respectively, each LED is turned off.

That is, when an imaging range of at least one of the first and second imaging units reaches a predetermined state corresponding to the display of the guide, the guide display state is changed from ON to OFF. Thus, the user can easily know that the change in the imaging units in the desired direction is completed.

In this way, the imaging device 600 according to this example notifies the user of a location to which at least one of the first and second imaging units to be moved in accordance with the imaging position or the imaging frame designated by the user.

Further, whether the synthesizing unit performs the synthesizing process is changed in accordance with the imaging position or the imaging frame designated by the user. In such a configuration, at a location which the user desires to monitor, an imaging direction of each multi-eye camera can be controlled more easily than in the related art.

In the foregoing example, the plurality of display elements such as LEDs are disposed in the periphery of the imaging device and how the direction of the imaging device is changed is displayed. However, for example, a CG image as in FIG. 13B or 13D may be displayed as a guide on the entire display screen of a display unit. Alternatively, a sub-screen may be superimposed and displayed on an image displayed on a display unit and the CG image as in FIG. 13B or 13D may be displayed in the sub-screen.

How the directions of the imaging units are changed may be displayed as a guide on the entire screen or a sub-screen, as described above. In such a configuration, in particular, a user operating the imaging device remotely can easily control the directions of the imaging units remotely, viewing the screen of the display unit.

Figure 14A:
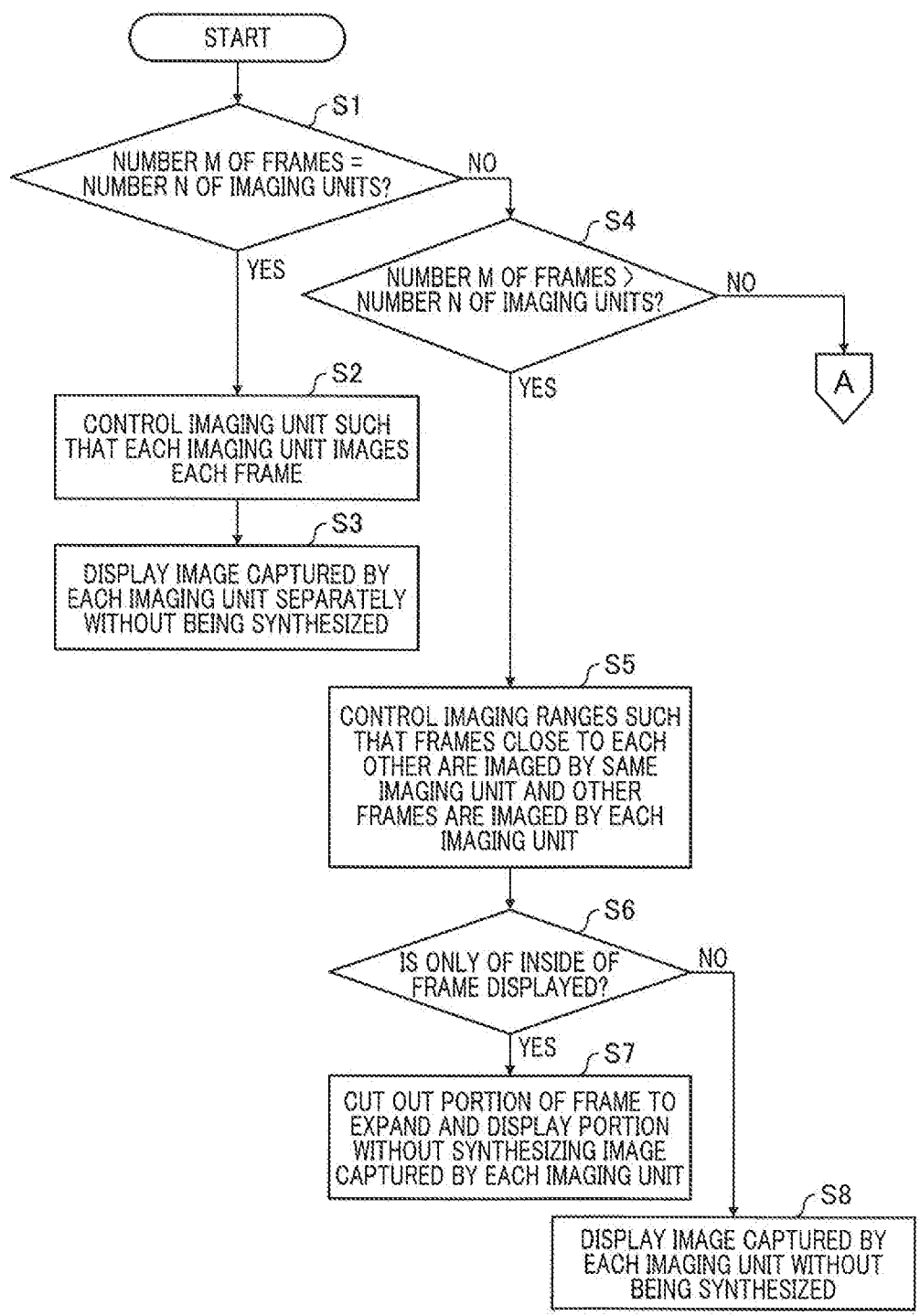
FIG. 14A to 14B are flowcharts illustrating an operation of an imaging device according to an example.
Figure 14B:
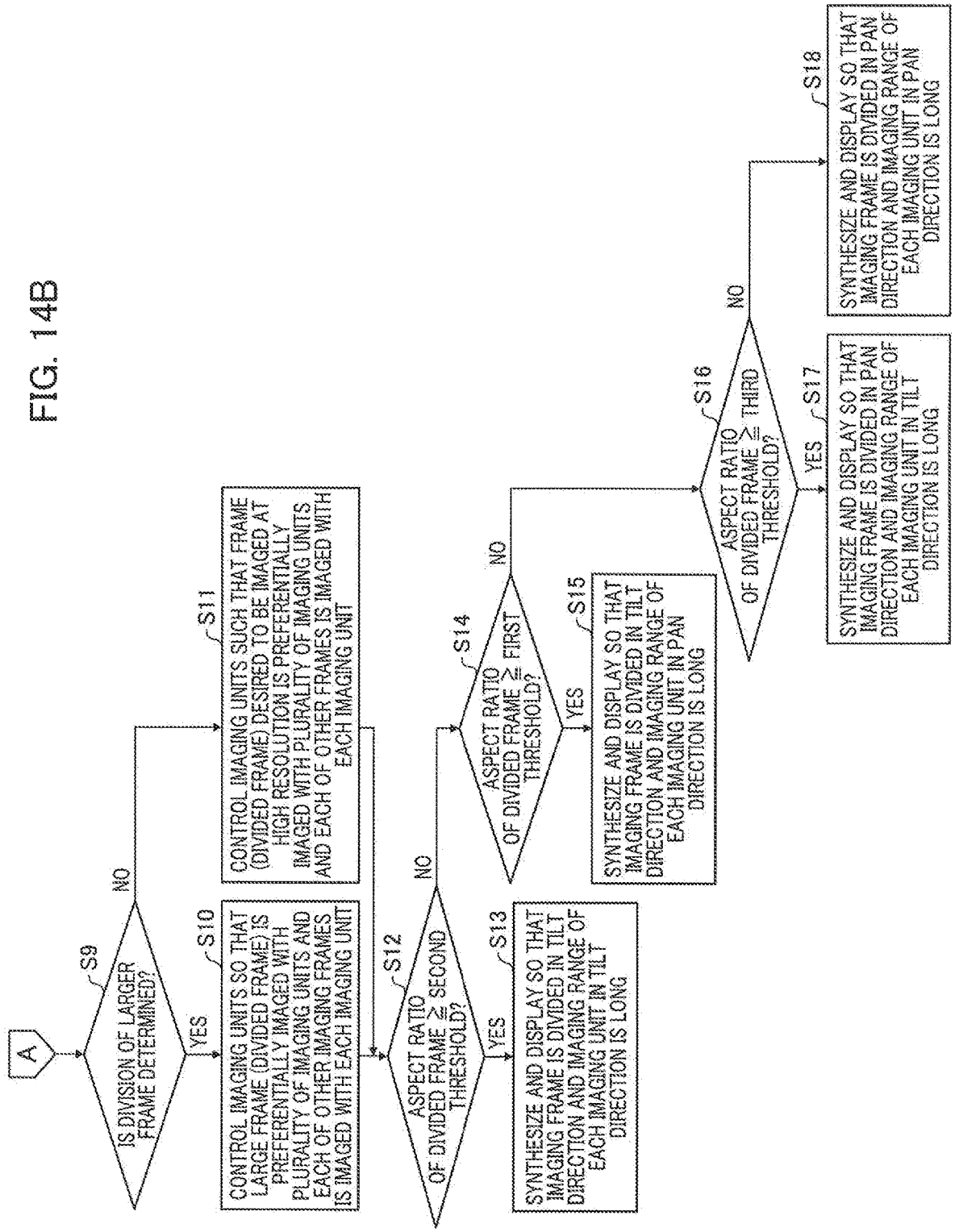

FIG. 14A to 14B are flowcharts illustrating an operation of an imaging device according to an example. In this connection, steps for displaying are performed in the client device.

In step S1 of FIG. 14A, a user determines whether the number M of imaging positions or imaging frames designated by the user is equal to the number N of imaging units.

In the case of Yes in step S1, an imaging range of the imaging unit is controlled such that each imaging unit images each imaging position or imaging frame in step S2. That is, the imaging direction, the zoom magnification, rotation of the imaging surface, or the like is controlled. In step S3, an image captured by each imaging unit is displayed separately without being synthesized.

Conversely, in the case of No in step S1, the process proceeds to step S4 to determine whether the number M of imaging positions or imaging frames>the number N of imaging units. In the case of Yes, the process proceeds to step S5, the imaging range of each imaging unit is controlled such that the frames close to each other are imaged by the same imaging unit and each of the other imaging positions or imaging frames is imaged by each imaging unit.

Subsequently, in step S6, it is determined whether a menu or the like is set so that only the inside of the imaging frame is displayed. In the case of Yes, in step S7, an image corresponding to the imaging frame is cut out and displayed without synthesizing an image captured by each imaging unit. The portion cut out at that time may be appropriately expanded and displayed.

Conversely, in the case of No in step S6, the process proceeds to step S8, and the image captured by each imaging unit is not synthesized and the image is displayed without being cut out.

Subsequently, in the case of No in step S4, in step S9, it is determined whether a larger imaging frame is set to be preferentially divided.

In the case of Yes, in step S10, the imaging range of the imaging unit is controlled such that the largest imaging frame is preferentially divided and imaged with the plurality of imaging units to be synthesized and each of the other imaging frames are imaged with each imaging unit.

In the case of No in step S9, the process proceeds to step S11 and the imaging ranges of the imaging units are controlled such that, for example, an imaging frame which the user desires to preferentially image at high resolution is divided and imaged with the plurality of imaging units to be synthesized and each of the other imaging frames are imaged with each imaging unit. The foregoing operations of steps S4 to S11 correspond to the operation of Example 5.

In step S12 after step S10 or S11, it is determined whether an aspect ratio of the divided and imaged imaging frame (the divided frame) is equal to or greater than the second threshold. In the case of Yes in step S12, the process proceeds to step S13 and the imaging surface of each imaging unit is rotated so that the imaging frame is divided in the tilt (vertical) direction and the length of the imaging range of each imaging unit in the tilt direction is long.

That is, the imaging frame is rotated by 90 degrees to be vertically long and the images from each imaging unit are synthesized and displayed.

Conversely, in the case of No in step S12, in step S14, it is determined whether an aspect ratio of the divided and imaged imaging frame (the divided frame) is equal to or greater than the first threshold.

In the case of Yes in step S14, the process proceeds to step S15 and the imaging frame is divided in the tilt (vertical) direction. The imaging frame is imaged with the length of the imaging range of each imaging unit in the pan direction being long (that is, horizontally long), and the images from each imaging unit are synthesized and displayed.

In the case of No in step S14, in step S16, it is determined whether an aspect ratio of the divided and imaged imaging frame (the divided frame) is equal to or greater than the third threshold. In the case of Yes in step S16, the process proceeds to step S17 and the imaging frame is divided in the pan direction.

The length of the imaging range of each imaging unit in the tilt direction is rotated by 90 degrees to be long (that is, vertically long) and the images from each imaging unit are synthesized and displayed.

Conversely, in the case of No in step S16, in step S18, the imaging frame is divided in the pan direction and is imaged with the length of the imaging range of each imaging unit in the pan direction being long (that is, horizontally long), and the images from each imaging unit are synthesized and displayed.

The control of steps S12 to S18 corresponds to the operation described in Example 4 and a relation of the second threshold>the first threshold>the third threshold is satisfied, as described in Example 4.

The present invention has been described above in detail with reference the preferred examples, but the present invention is not limited to the foregoing examples and various modifications can be made based on the gist of the present invention and the modifications are not excluded from the scope of the present invention.

For example, in the foregoing examples, each imaging unit is configured to change each imaging range (the imaging direction, the zoom magnification, the rotational angle of the imaging surface about the optical axis thereof, or the like) by the driving mechanism. However, for example, a driving mechanism capable of controlling an imaging range of at least one imaging unit may be included and imaging ranges of a plurality of imaging units may accordingly be able to be changed relatively.

A computer program realizing the functions of the above-described examples in some or all of the control in these examples may be supplied to an imaging device via a network or any of various storage media. A computer (or a CPU, an MPU, or the like) in the imaging device may read and execute the program. In this case, the program and a storage medium that stores the program are configured in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-108881 filed on Jun. 11, 2019, which is hereby incorporated by reference herein in its entirety.

What is claimed is:

1. An imaging device connected to an external apparatus via a network comprising:
a first imaging unit that is capable of changing an imaging area of the first imaging unit;
a second imaging unit that is capable of changing an imaging area of the second imaging unit; and
at least one processor or circuit which functions as:
a synthesizing unit configured to synthesize a first image acquired by the first imaging unit and a second image acquired by the second imaging unit to generate a wide-angle image;
a receiving unit configured to receive information relating to a region or a position designated by a user from the external apparatus, wherein the region or the position is designated with the wide-angle image, with the first image, with the second image or with an image indicating a region corresponding to the wide-angle image;
a determining unit configured to determine whether the synthesizing unit performs synthesizing or not, in accordance with the region or the position designated by the user; and
an acquiring unit configured to acquire the wide-angle image in a case where the determining unit determines that the synthesizing unit performs synthesizing, and at least one of the first image and the second image in a case where the determining unit determines that the synthesizing unit does not perform synthesizing.

2. The imaging device according to claim 1, wherein the first imaging unit or the second imaging unit changes the corresponding imaging area by changing at least one of an imaging direction, a zoom magnification, and rotational angles of an imaging surface of the first imaging unit or the second imaging unit.

3. The imaging device according to claim 1, wherein, when the number of designated regions or positions is one, at least one of the imaging area of the first imaging unit and the imaging area of the second imaging unit is changed, and the synthesizing unit performs synthesizing.

4. The imaging device according to claim 3, wherein, when the number of designated regions is one, the determining unit determines whether the first imaging unit and the second imaging unit divide and image the region in a vertical direction or divide and image the region in a horizontal direction in accordance with an aspect ratio of the region.

5. The imaging device according to claim 4, wherein the region is divided and imaged in the vertical direction when the aspect ratio is greater than a first value and the region is divided and imaged in the horizontal direction when the aspect ratio is less than the first value.

6. The imaging device according to claim 1, wherein the at least one processor or circuit further functions as:
an acquiring unit that is capable of acquiring the wide-angle images for designating the region or the position by the user in a state in which imaging areas of the first imaging unit and the second imaging unit are set to be broadest.

7. The imaging device according to claim 1, wherein, when the number of designated regions or positions is two, the imaging areas of the first imaging unit and the second imaging unit are changed and the synthesizing unit not to perform synthesizing.

8. The imaging device according to claim 1, wherein the at least one processor or circuit further functions as:
a third imaging unit that is capable of changing an imaging area of the third imaging unit, and
wherein, when the number of designated regions or positions is greater than the number of imaging units, at least two regions or positions among the regions or the positions are included in the imaging area of one of the first imaging unit, the second imaging unit, and the third imaging unit.

9. The imaging device according to claim 1, wherein the at least one processor or circuit further functions as:
an acquiring unit that is capable of trimming an image corresponding to the designated region.

10. The imaging device according to claim 1, wherein the at least one processor or circuit further functions as:
a third imaging unit that is capable of changing an imaging area of the third imaging unit, and
wherein, when the number of designated regions or positions is less than the number of imaging units, at least one region between the regions or the positions is divided and imaged with one or more of the first and second imaging units.

11. The imaging device according to claim 1, wherein the at least one processor or circuit functions as at least one display element configured to display the designated region or position to control at least one of the first imaging unit and the second imaging unit.

12. A display control apparatus connected to an imaging device via a network, the imaging device comprising a first imaging unit that is capable of changing an imaging area of the first imaging unit, a second imaging unit that is capable of changing an imaging area of the second imaging unit and at least one first processor or circuit which functions as a synthesizing unit that is capable of synthesizing a first image acquired by the first imaging unit and a second image acquired by the second imaging unit to generate a wide-angle image, the display control apparatus comprising:
at least one second processor or circuit which functions as:
an obtaining unit configured to obtain information relating to a region or a position designated by a user, wherein the region or the position is designated with the wide-angle image; and
a display control unit configured to display a guide indicating how to change the imaging area of at least one of the first imaging unit and the second imaging unit in accordance with the designated region or position.

13. The display control apparatus according to claim 12, wherein the display control unit changes a display state of the guide when the imaging area of at least one of the first imaging unit and the second imaging unit reaches a predetermined state corresponding to the displayed guide.

14. A method for controlling an imaging device connected to an external apparatus, via a network, that has:
a first imaging unit that is capable of changing an imaging area of the first imaging unit;
a second imaging unit that is capable of changing an imaging area of the second imaging unit,
wherein the method comprises:
synthesizing a first image acquired by the first imaging unit and a second image acquired by the second imaging unit to generate a wide-angle image;
receiving information relating to a region or a position designated by a user from the external apparatus, wherein the region or the position is designated with the wide- angle image, with the first image, the second image or with an image indicating a region corresponding to the wide-angle image;

determining whether the synthesizing is performed or not, in accordance with the designated region or position designated by the user; and acquiring the wide-angle image in a case where it is determined that the synthesizing is performed, and at least one of the first image and, the second image in a case where it is determined that synthesizing is not performed.

15. A non-transitory computer-readable storage medium that stores a computer program to control an imaging device connected to an external apparatus, via a network, that has:

at least one processor or circuit which functions as:

a first imaging unit that is capable of changing an imaging area of the first imaging unit;

a second imaging unit that is capable of changing an imaging area of the second imaging unit;

a synthesizing unit configured to synthesize a first image acquired by the first imaging unit and a second image acquired by the second imaging unit and generate a wide-angle image; and a receiving unit configured to receive information relating to a region or a position designated by a user from the external apparatus, wherein the region or the position is designated with the wide-angle image, with the first image, with the second image or with an image indicating a region corresponding to the wide-angle image, wherein the computer program comprises instructions for executing following processes of:

determining whether the synthesizing unit performs synthesizing or not, in accordance with the designated region or position designated by the user; and acquiring the wide-angle image in a case where it is determined that the synthesizing is performed, and at least one of the first image and, the second image in a case where it is determined that the synthesizing is not performed.

* * * * *